(12) United States Patent
Lähdesmäki

(10) Patent No.: US 7,681,149 B2
(45) Date of Patent: Mar. 16, 2010

(54) USER INTERFACE DISPLAY FOR SET-TOP BOX DEVICE

(75) Inventor: Petri Lähdesmäki, Espoo (FI)

(73) Assignee: Nokia Corporation, Espoo (FI)

( * ) Notice: Subject to any disclaimer, the term of this patent is extended or adjusted under 35 U.S.C. 154(b) by 1335 days.

(21) Appl. No.: 10/442,487

(22) Filed: May 21, 2003

(65) Prior Publication Data

US 2004/0233238 A1    Nov. 25, 2004

(51) Int. Cl.
*G06K 15/00* (2006.01)
(52) U.S. Cl. .................... 715/841; 715/854
(58) Field of Classification Search ......... 715/721–723, 715/801, 802, 804–805, 784–786, 765, 767, 715/841–842, 853–854, 845
See application file for complete search history.

(56) References Cited

U.S. PATENT DOCUMENTS

| | | | |
|---|---|---|---|
| 5,485,197 A | 1/1996 | Hoarty | |
| 5,909,684 A * | 6/1999 | Nelson | 707/103 R |
| 6,037,933 A | 3/2000 | Blonstein et al. | |
| 6,047,317 A | 4/2000 | Bisdikian et al. | |
| 6,091,956 A * | 7/2000 | Hollenberg | 455/456.5 |
| 6,262,722 B1 | 7/2001 | Allison et al. | |
| 6,281,898 B1 | 8/2001 | Nikolovska et al. | |
| 6,377,285 B1 * | 4/2002 | Doan et al. | 715/764 |
| 6,397,387 B1 | 5/2002 | Rosin et al. | |
| 6,433,801 B1 * | 8/2002 | Moon et al. | 715/840 |
| 6,445,398 B1 | 9/2002 | Gerba et al. | |
| 6,557,016 B2 * | 4/2003 | Tanigawa et al. | 715/246 |
| 6,741,232 B1 * | 5/2004 | Siedlikowski et al. | 345/156 |
| 6,855,408 B2 | 2/2005 | Shimomura et al. | |
| 7,293,241 B1 | 11/2007 | Törnqvist et al. | |
| 2002/0063738 A1 * | 5/2002 | Chung | 345/810 |
| 2002/0086683 A1 | 7/2002 | Kohar et al. | |
| 2002/0196268 A1 | 12/2002 | Wolff et al. | |
| 2003/0001898 A1 | 1/2003 | Bernhardson | |
| 2003/0001901 A1 | 1/2003 | Crinon et al. | |
| 2003/0001907 A1 * | 1/2003 | Bergsten et al. | 345/853 |
| 2003/0090524 A1 | 5/2003 | Segerberg | |
| 2003/0095149 A1 | 5/2003 | Fredriksson | |
| 2003/0169302 A1 | 9/2003 | Davidsson | |
| 2004/0008229 A1 | 1/2004 | Hultcrantz | |
| 2004/0140995 A1 | 7/2004 | Goldthwaite et al. | |
| 2004/0233238 A1 | 11/2004 | Lahdesmaki | |
| 2004/0233239 A1 | 11/2004 | Lahdesmaki | |
| 2006/0277574 A1 * | 12/2006 | Schein et al. | 725/42 |

FOREIGN PATENT DOCUMENTS

| | | |
|---|---|---|
| EP | 1 120 703 A2 | 8/2001 |
| EP | 1 186 987 A2 | 3/2002 |
| EP | 1 291 754 A2 | 3/2003 |

(Continued)

*Primary Examiner*—Steven P Sax
(74) *Attorney, Agent, or Firm*—Banner & Witcoff, Ltd.

(57) ABSTRACT

User interface systems and methods are disclosed. The user interfaces include at least one focus pointer that allow a user to quickly access the elements contained in a plurality of folders. A fixed focus pointer selects one of a plurality of elements of a main folder in response to interaction of a user. A moveable focus pointer scrolls through a plurality of elements of the first subfolder to select a second subfolder in response to interaction of a user. The user interface may include additional folders and focus pointers.

87 Claims, 20 Drawing Sheets

FOREIGN PATENT DOCUMENTS

| | | |
|---|---|---|
| EP | 1291754 | 3/2003 |
| EP | 1 351 500 A2 | 10/2003 |
| EP | 1351500 | 10/2003 |
| EP | 1 185 922 B1 | 6/2004 |
| WO | 00/31972 A1 | 6/2000 |
| WO | 00/65429 A1 | 11/2000 |
| WO | WO 00/65429 | 11/2000 |
| WO | 01/22719 A2 | 3/2001 |
| WO | WO 01/42948 A2 | 6/2001 |
| WO | 01/74062 A1 | 10/2001 |
| WO | 02/1337 A1 | 1/2002 |
| WO | WO 02/01337 | 1/2002 |
| WO | 03/003180 A2 | 1/2003 |
| WO | 03/003186 A1 | 1/2003 |
| WO | WO 03/003180 | 1/2003 |
| WO | WO 03/003186 | 1/2003 |
| WO | 03/043318 A1 | 5/2003 |
| WO | WO 03/043318 | 5/2003 |

\* cited by examiner

USER INTERFACE DISPLAY FOR SET-TOP BOX DEVICE

FIELD OF THE INVENTION

The invention relates to a method and apparatus for selecting or adjusting services or settings of an electronic device on a display of the electronic device. More particularly, the invention provides methods and devices for providing a user interface.

BACKGROUND OF THE INVENTION

Set-top boxes (STBs), televisions, digital video disc (DVD) players, digital video recorders (DVRs), personal video recorders (PVRs), video cassette recorders (VCRs), etc. are being used to provide an increasing number of services to users. As the number of services and the complexity of the hardware have increased, new user interfaces have been developed to assist users in entering and receiving information.

FIG. 1 illustrates a typical user interface 100. A user can navigate through the elements in folder 102 by pressing right and left keys on a remote control device to move elements under focus pointer 112. The user can also navigate through the elements in folder 104 by pressing up and down keys on the remote control. As is apparent from FIG. 1, additional folders and bookmarks may be displayed by entering the appropriate commands. For example, when element 106 is under focus pointer 112 and the user presses the right key on the remote control, element 108 comes into view and element 110 is removed from user interface 100. Focus pointer 112 remains stationary while elements in folders 102 and 104 move under focus pointer 112 in response to commands from a user.

User interface 100 can only be used to organize a limited number of elements. Therefore, there exists a need in the art for user interface systems and methods that allow users to organize increasing numbers of media types with more functionality without substantially increasing the complexity of the user interface.

SUMMARY OF THE INVENTION

One or more of the above-mentioned needs in the art are satisfied by the disclosed user interface device, systems and methods. The user interfaces include at least horizontal and vertical bars with at least one focus pointer that allows a user to quickly and easily access the elements contained in bars. The bar can also be described in terms of a folder, that will be used later in this document.

A first embodiment of the invention provides an apparatus for generating a user interface for display on a display device. The apparatus includes a processor programmed to generate a user interface. The user interface includes a main scrollable folder containing a plurality of elements, a first subfolder containing a plurality of elements and linked to the main folder and second subfolder containing a plurality of elements and linked to the first subfolder and as many sub folders as needed linked to a previous subfolder to provide the adequate level of functionality to the user interface. A fixed focus pointer selects one of the pluralities of elements of the main folder in response to interaction of a user. The selected element determines the content and elements of the first level subfolder. A first moveable focus pointer scrolls through the plurality of elements of the first subfolder to select the second subfolder in response to interaction of a user. A second moveable focus pointer scrolls through the plurality of elements of the second subfolder to select one of the elements in response to interaction of a user. The structure of the user interface is adaptable and therefore capable of managing many different kinds of media via this structure. The usage is familiar and easy to a user. Menu hierarchy with more than three levels may be displayed, e.g. more information and by more user friendly way than in the prior known manner.

In other embodiments of the invention some or all information and/or messages will be originated from one or more networks and the information and/or messages will be stored in a memory unit and may be given identification codes that place them into the right place in the user interface.

In other embodiments of the invention a whole or a partial structure of a user interface may be transmitted to a memory unit in a second device and used in a user interface of the second device alone or with an original user interface of the second device.

In other embodiments of the invention, computer-executable instructions for implementing the disclosed methods are stored as control logic or computer-readable instructions on computer-readable media, such as an optical or magnetic disk.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Figure 1:
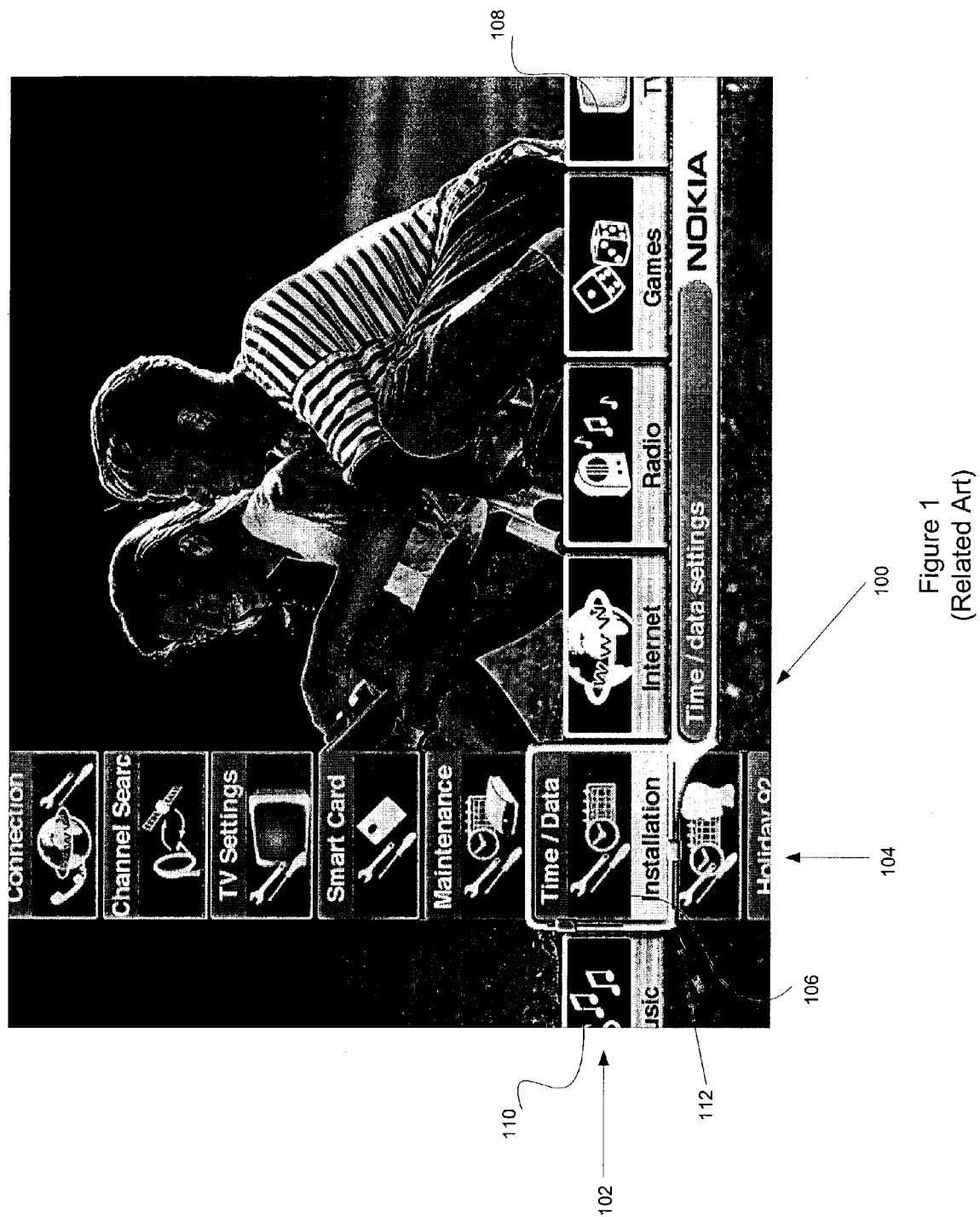
FIG. 1 shows a related art user interface having a single focus pointer.
Figure 2A:
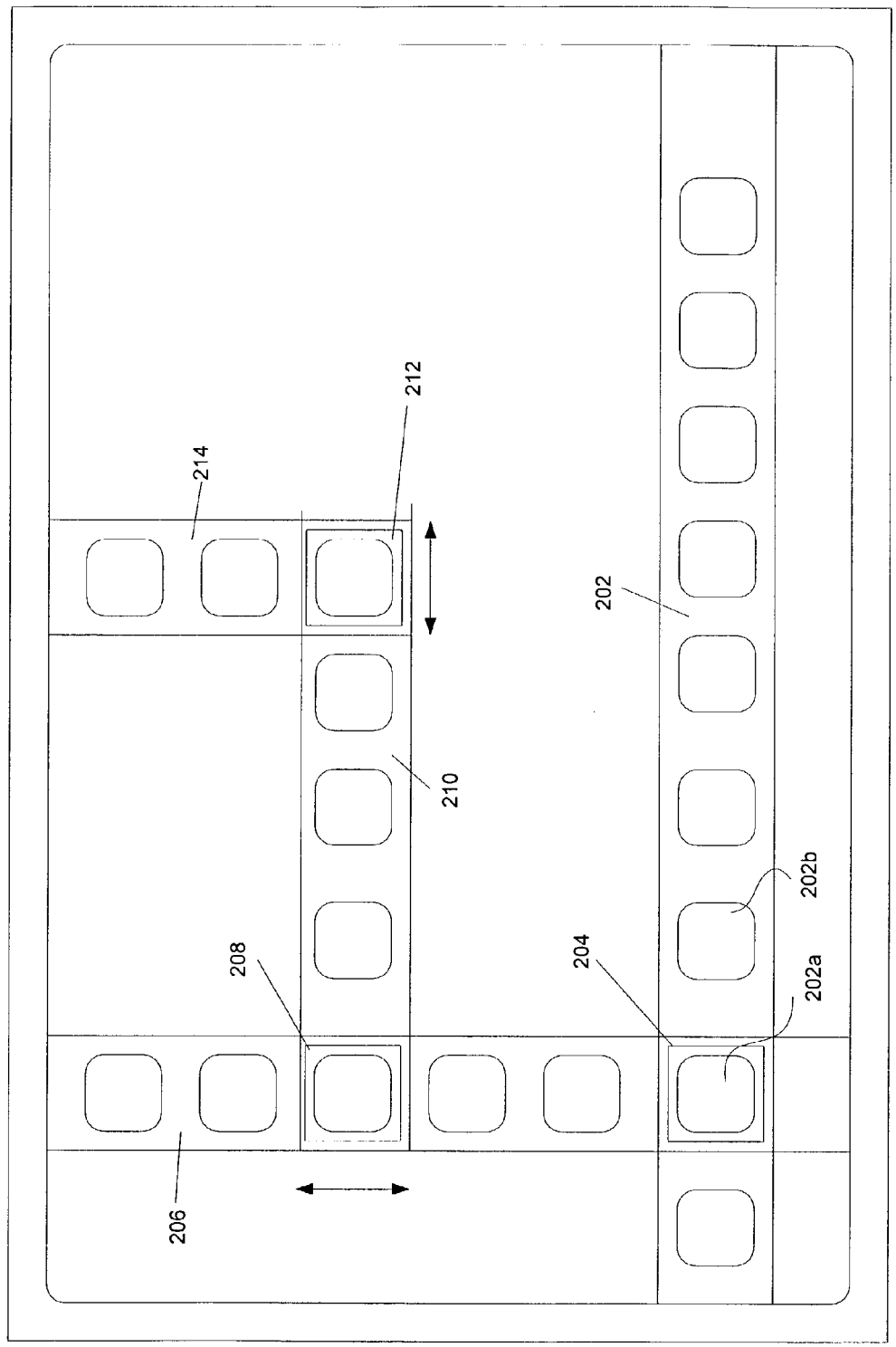
FIGS. 2A, 2B and 2C show user interfaces displayed on display devices in accordance with an embodiment of the invention.

FIG. 2A illustrates a user interface displayed on a display device 200 in accordance with an embodiment of the invention. A main cyclically scrollable folder 202 includes a plurality of elements, e.g. elements 202a and 202b. A folder may contain related elements and may be displayed in the form of a menu bar. In one embodiment of the invention, the elements comprise icons, with or without text information, representing media types and general settings and functions related to a device and a system. A user may select a particular element by moving the element under a fixed focus pointer 204 by using left and right arrow keys in a remote controller. A new cyclically scrollable subfolder 206 may be linked to the main folder 202 graphically or placed in the vicinity of the main folder and/or at least partially aligned with the fixed focus pointer 204 and/or perpendicularly directed to the main folder. In particular, folder 206 may be displayed when element 202a is under focus pointer 204. A new cyclically scrollable folder, that may have a new focus pointer, (not shown) may be displayed simultaneously when element 202b is positioned under focus pointer 204. Alternatively a new folder may be invoked by the user pressing an up arrow key on a remote controller. The elements in folder 202 may for example comprise channels, media types or general settings.

The user can move a moveable focus pointer 208 along folder 206 to select elements in folder 206. In the embodiment shown, moveable focus pointer 208 is restricted to movement along a vertical axis. The appearance of elements may change when the elements are under a focus pointer. For example, the element may become brighter, change color or otherwise indicate that the element is under a focus pointer. The elements in folder 206 may for example comprise choices for channels, media types or general settings that are presented in a form of a folder.

The selection of an element in folder 206 may cause another cyclically scrollable folder, such as folder 210 to be displayed. The new sub folder 210 may be displayed simultaneously when the element is positioned under focus pointer 208. Alternatively the new folder may be invoked by the user pressing a right arrow key on a remote control device. Folder 210 may include another plurality of elements and another moveable focus pointer 212 may be used to select an element within folder 210. In the embodiment shown, moveable focus pointer 212 is restricted to movement along a horizontal axis. As is shown in FIG. 2A, the selection of an element in folder 210 may cause another folder 214 containing elements to be simultaneously displayed. Alternatively, the new folder may be invoked by the user pressing an up arrow key on a remote control device.

In general, when cyclically scrolling the moveable focus pointer reaches the last element at one end of the folder it stays in a fixed end position as long as scrolling is continued and the elements outside the visible folder move to the location of the focus pointer. For example, when the moveable focus pointer reaches the last element at the upper end of the folder and the scrolling is continued in an upward direction, elements outside the visible folder area move downwards to the fixed end position of the moveable focus pointer. The moveable focus pointer functions in a similar manner at the lowest end of the folder.

Further in general, another lower level folder with new elements may also be displayed simultaneously or specially invoked by the user according to an element in a focus pointer when scrolling on a previous higher level folder.

A display device can represent only a certain number of elements on its display. This may depend, for example, on the size of the display, the resolution of the display or a user's preferences. When there are more elements in the folder than can be represented at one time on the display, the elements in the folder are not visible but they are still a part of the folder structure and remain as selectable elements. When scrolling in the folder elements that weren't represented on the display scroll from one end of the folder to the display and will become visible. At the same time elements at another end of the folder scroll outside of the display and become invisible but remain still selectable in the folder structure.

A new folder may be linked to a previous folder graphically and/or placed in the vicinity of the previous folder and/or at least partially aligned with a focus pointer in the previous folder and/or perpendicularly directed to the previous folder.

In one embodiment of the invention, a path of navigation between folders in the user interface is presented and visible for a user. The appearance of all selected elements are graphically altered to show previous selections. The path is also indicated by elements in cross sections of two folders.

One skilled in the art will appreciate that numerous additional folders and focus pointers may be included to allow a user to navigate through alternating horizontal and vertical folders. Also one skilled in the art will appreciate that a constellation of the user interface with folders may be built and placed starting from any of the edges of the user interface not only from the lower horizontal edge. Similarly the functionality of the user interface may, of course, be modified according to the constellation of the user interface.

The selected element in the previous folder determines the content and elements of the next level subfolder. In one embodiment of the invention, the elements in the main scrollable folder of the user interface comprise media types and the elements in the first subfolder comprise choices corresponding to the selected media types and the elements in the second subfolder comprise definitions of appearance of the choices corresponding to the selected media types and the elements in the third subfolder comprise a predefined actions and functions folder or an information folder available to each appearance of choices.

Figure 2B:
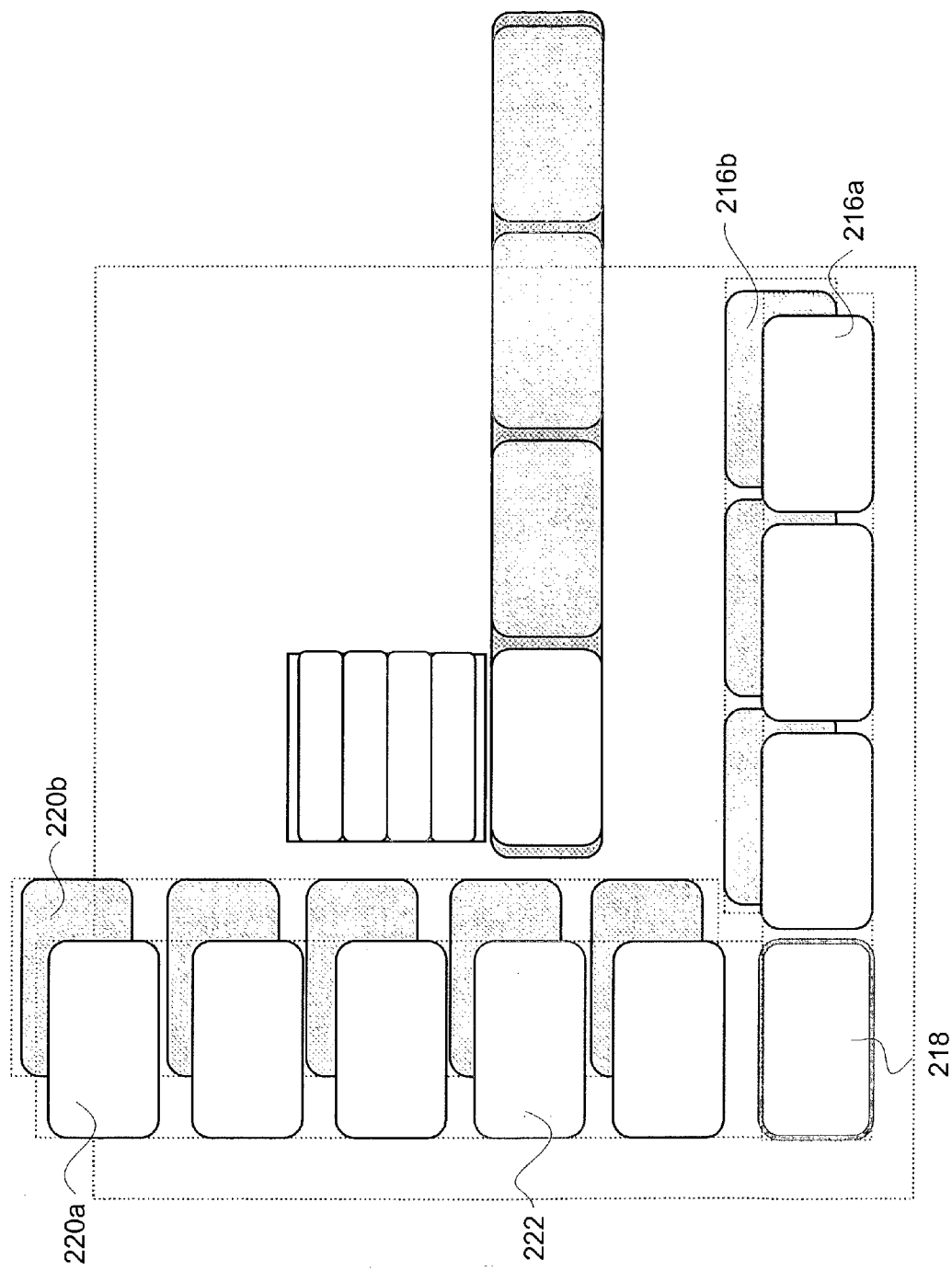

FIG. 2B illustrates a modified user interface of FIG. 2A displayed on a display device in accordance with an embodiment of the invention. A main scrollable folder may be displayed in a form of two folders, bars, columns or rows, upper 216a and lower 216b that may placed partly one on the other or by side, and that may have only one fixed focus pointer 204, and that may be scrollable together by cyclic manner as a single unit and all the elements in them are selectable. The lower or side folder 216b may be, but not necessarily, graphically altered from the upper folder 216a, for example, folder 216b may become brighter or darker or transparent, change color or otherwise indicate the position. Information presented in the elements of the lower or side folders may still be visible for the user, so that they indicate the content of the elements. In one embodiment, a user may also change the order of the folders by pressing a down arrow key or double clicking some other key on a remote control device 400 (shown in FIG. 4), such as OPTIONS 406, INFO 408 or OK 414 key. A user may select a particular element by scrolling the element under the fixed focus pointer by using left and right arrow keys on the remote control device. When scrolling elements move from upper main folder to the rear main folder and vice versa.

At the same time a first sub folder may be displayed in the form of two folders, bars, columns or rows, upper 220a and lower 220b, that may placed partly one on the other or side by side, that may have only one moveable focus pointer 218, and that may be scrollable together by cyclic manner as a single unit and all the elements in them are selectable. The lower or side folder 220*b* may be graphically altered, but not necessarily, from the upper folder 220*a*, for example, folder 220*b* may become brighter or darker or transparent, change color or otherwise indicate the position. Information presented in the elements of lower or side folders may still be visible for the user, so that they indicate the content of the elements. A user may select a particular element by scrolling a moveable focus pointer by using up and down arrow keys on the remote control device. A user may also change the order of the folders by pressing a left arrow key or double clicking some other key on remote control device 400 (shown in FIG. 4), such as OPTIONS 406, INFO 408 or OK 414 key. In another embodiment, the order of the folders may be directly changed and a new element from the new upper folder may be selected when a user single or double clicks a right arrow key on remote control device 400 in any position of a moveable focus pointer. If the system is adjusted for a single click function a second level subfolder doesn't show simultaneously. A user may invoke the second level subfolder by pressing an OK 414 key or any other specially defined key in remote control device 400.

Alternatively the first sub folder 206*a* and 206*b* may have a fixed focus pointer, i.e. the user may select a particular element by scrolling the element under the fixed focus pointer by using up and down arrow keys in remote control device 400. When scrolling elements move from upper first sub folder to the rear first sub folder and vice versa.

In the case that the two-folders structure does not have so many elements that a corresponding lower or side folder does not have any elements to present the lower folder may still be displayed. In this occurrence the elements that occur in the upper folder may be multiplied so that the upper and corresponding lower or side folder becomes full of the elements. In the case that there exists more elements in the folder than can be shown at one time, those elements may be invisible for the user when they are out of the area of the folder. When scrolling, the elements will become visible when they come to the area of the folder. At the same time the same number of elements as scrolled to the area of the folder will move out of the area of the folder and become invisible to the user. This way a user will see more, even all, elements in the folders at the one glance and navigation becomes even faster and more easily.

Figure 2C:
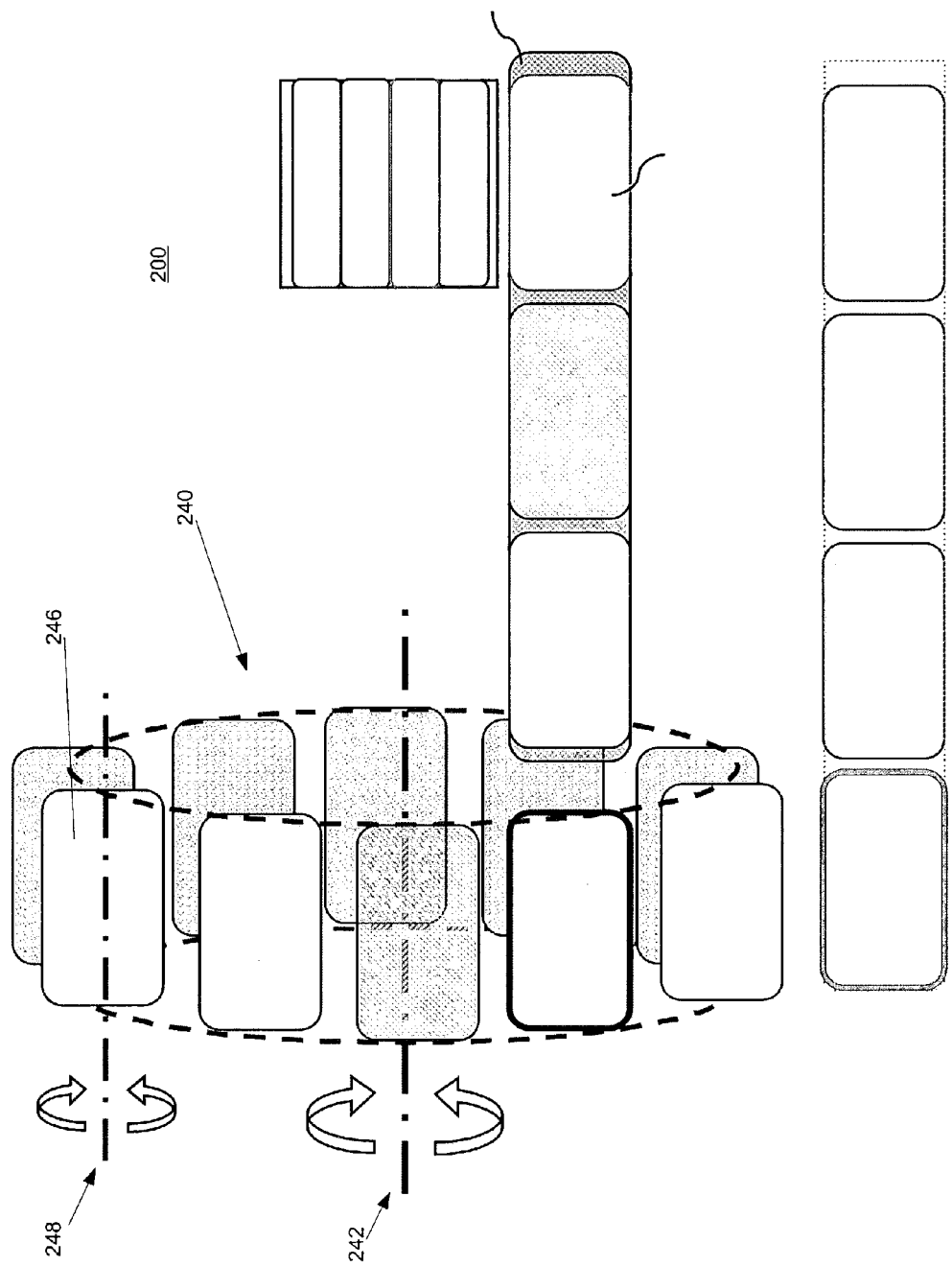

FIG. 2C illustrates another modified user interface of FIG. 2A displayed on a display device in accordance with an embodiment of the invention. A first sub folder may be displayed in a form of a carousel 240 or an oval whose rotation axis 242 is placed substantially horizontally and substantially parallel or at in visually suitable angle to the display 200 surface. The carousel may have only one moveable focus pointer used by arrow keys, and it may be scrollable by cyclic manner, and all the elements in it are selectable. The elements along carousel 240, such as element 246, have a common a certain mass in their lower part that keeps them in an upright position rotating them along on their horizontal axis 248 when the carousel 240 rotates. The elements in the carousel are displayed fully, i.e. they show a full face towards the user during the scrolling regardless of their position in the carousel.

When in scrolling the moveable focus pointer reaches one of the two outermost elements of the front carousel segment, i.e. the upmost or lowest element, it stays in a fixed end position as long as scrolling is continued, the carousel rotates and the elements outside of the front carousel segment move, one at a time, to the location of the focus pointer. For example, when the moveable focus pointer reaches the upmost element and the scrolling is continued in an upward direction, elements outside of the front carousel segment move, one at a time, to the fixed end position of the moveable focus pointer. The moveable focus pointer functions the similar way at the lower end of the folder.

Alternatively the carousel or oval may have a fixed focus pointer, i.e. the user may select a particular element by scrolling the element under the fixed focus pointer by using up and down arrow keys in remote control device 400.

In embodiments in which the carousel does not have enough elements to fill up the circle of the carousel, the elements may be multiplied so that carousel becomes full of the elements. This way a user will see more, even all, elements in the folders at one glance and navigation becomes faster and easier.

Figure 3:
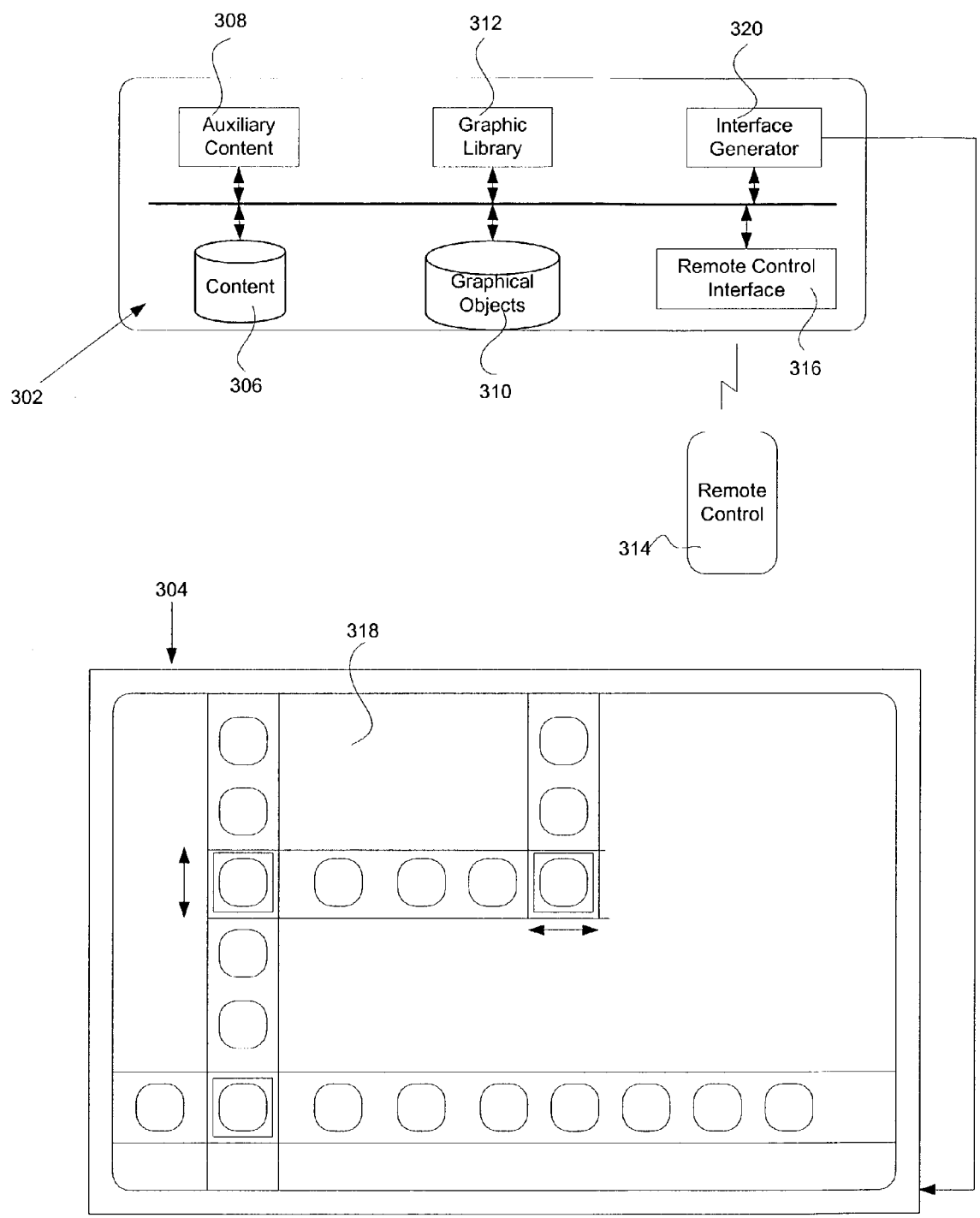
FIG. 3 illustrates a system for generating and displaying a user interface in accordance with an embodiment of the invention.

FIG. 3 illustrates a system for generating and displaying a user interface in accordance with an embodiment of the invention. A set-top box 302 is coupled to a television 304. In one embodiment, set-top box 302 receives services or content via any digital signal, such as an MPEG II video signal, DVB or Bluetooth etc. from any digital network or from any wireless or wireline digital device and converts the signal into a format suitable for a television, such as an NTSC or PAL or any digital television signals. One skilled in the art will appreciate that some or all of the components or functions can be performed by the components in set-top box 302 may be incorporated into television 304. Some or all of the functions can also be performed by a processor programmed with computer executable instructions.

Set-top box 302 may include a content database 306 that contains content that will be displayed on a user interface. Content may include text or data describing folders and elements. Auxiliary content 308 may include content received from external sources, such as a computer devices coupled to set-top box 302. Auxiliary content may include additional text and data. A graphical objects database 310 may be included to store graphical objects, such as icons, elements and a structure of one or more user interfaces. A graphical library 312 may be included to retrieve graphical objects from graphical objects database 310 and manipulate those objects. For example, graphical objects database 310 may store generic graphical icons and graphic library 312 may customize the appearance of some of the generic icons for a particular purpose. A user can personalize and change the appearance of icons to reflect her personal preferences and to show user identification.

A user may use a remote control device 314 for entering commands. Remote control 314 is coupled to a remote control interface 316. Set-top box 302 may be coupled to other input devices, such as a keyboard, a joystick, a mouse, a keypad device, wireless device or any other suitable device. An interface generator 320 may be included for generating user interface 318.

Figure 4:
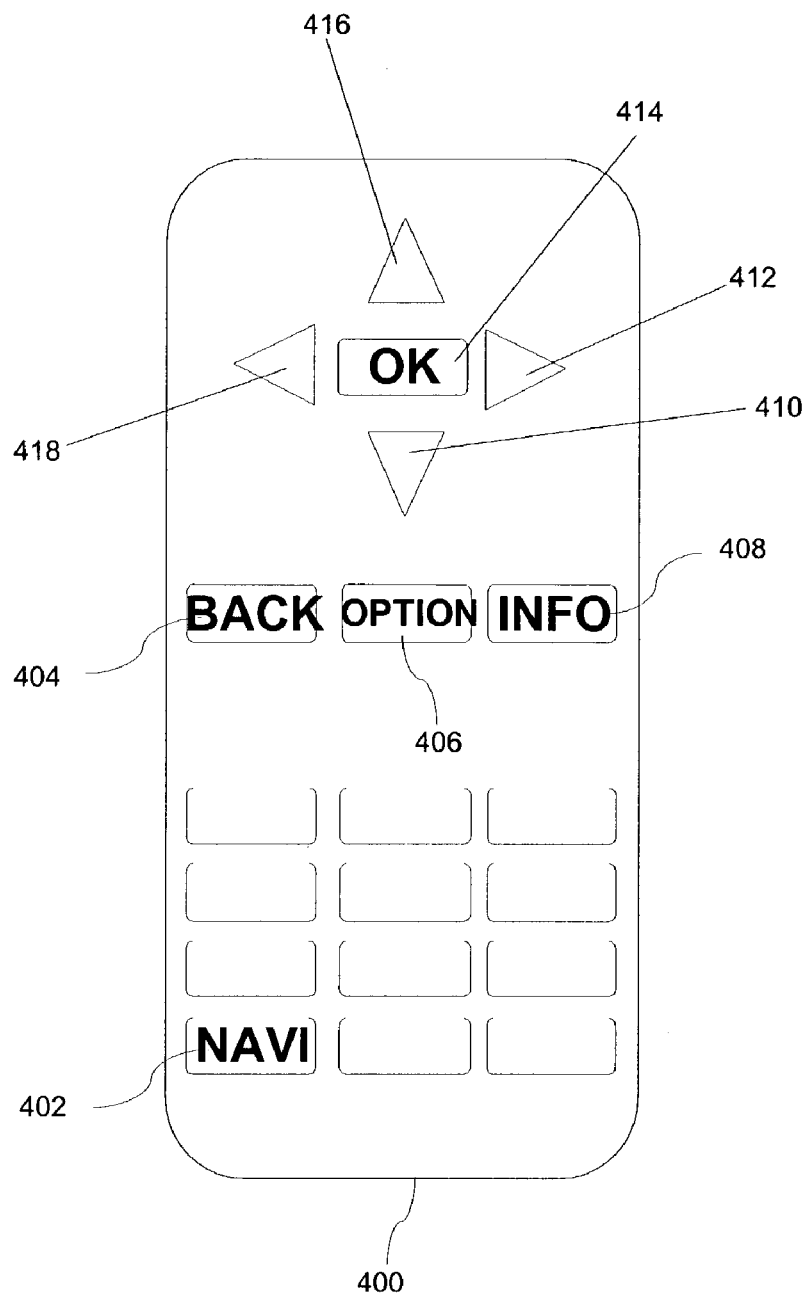
FIG. 4 illustrates a remote control device that may be used in accordance with an embodiment of the invention.

FIG. 4 illustrates a remote control device 400 that may be used in accordance with an embodiment of the invention. A user interface may be opened by pressing a button designated for navigation, e.g., NAVI™ key 402. OK button 414 or a Menu button (not shown) can also be used to open the user interface. In one embodiment, main scrollable folder 202 and first subfolder 206 are displayed when NAVI™ key 402 is selected. Selecting NAVI™ key 402 a second time or a BACK key 404 at any time during the navigation of the user interface will close the user interface.

An OPTION key 406 may be used to cause an options and actions folder 502 to appear next to a selected focus pointer 504 so that options and actions folder 502 and the focus pointer 504 are graphically linked together, as shown in FIG.

Figure 5A:
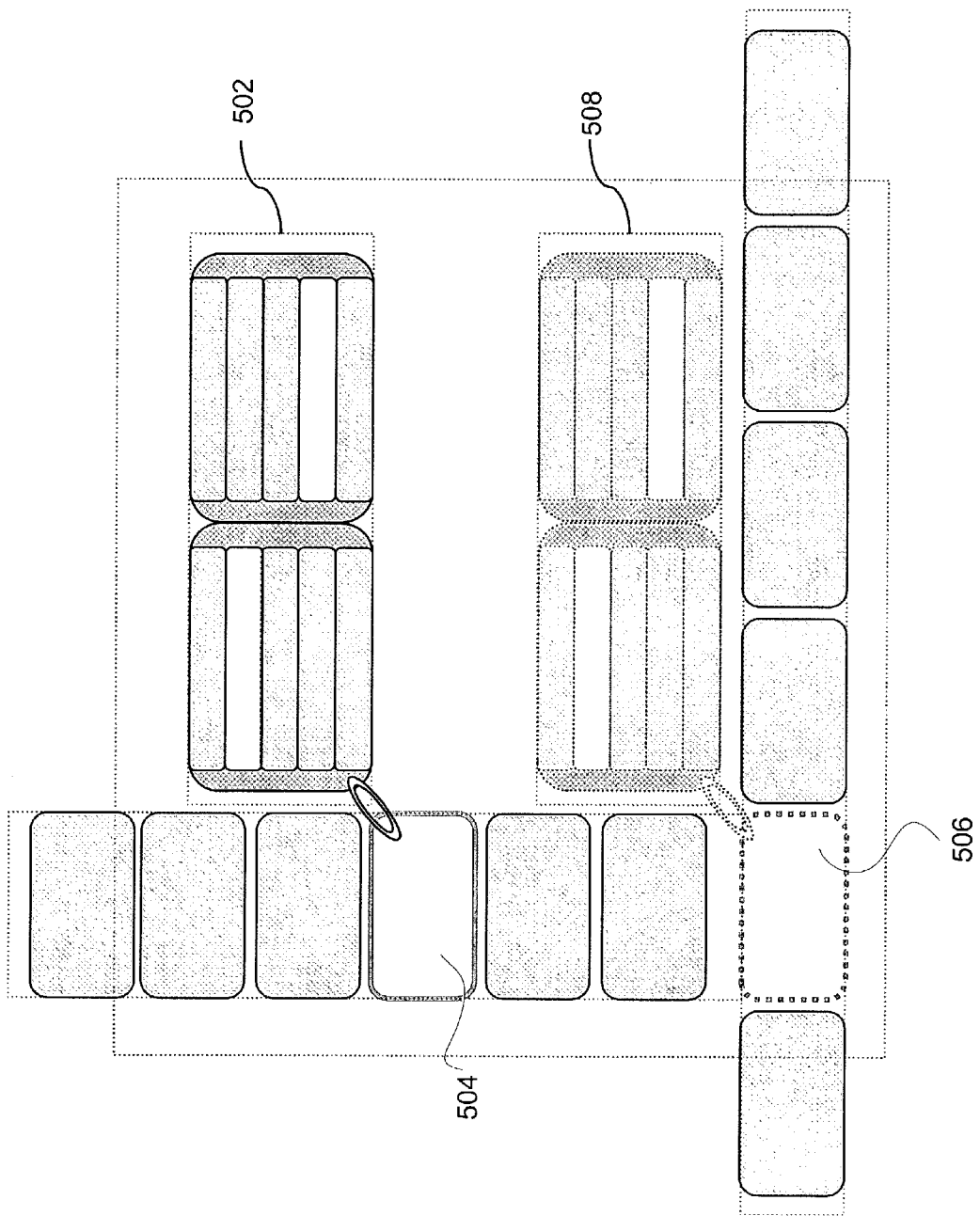
FIGS. 5A and 5B show embodiments in which an options and actions folder appears next to a selected focus pointer, in accordance with an embodiment of the invention.
Figure 5B:
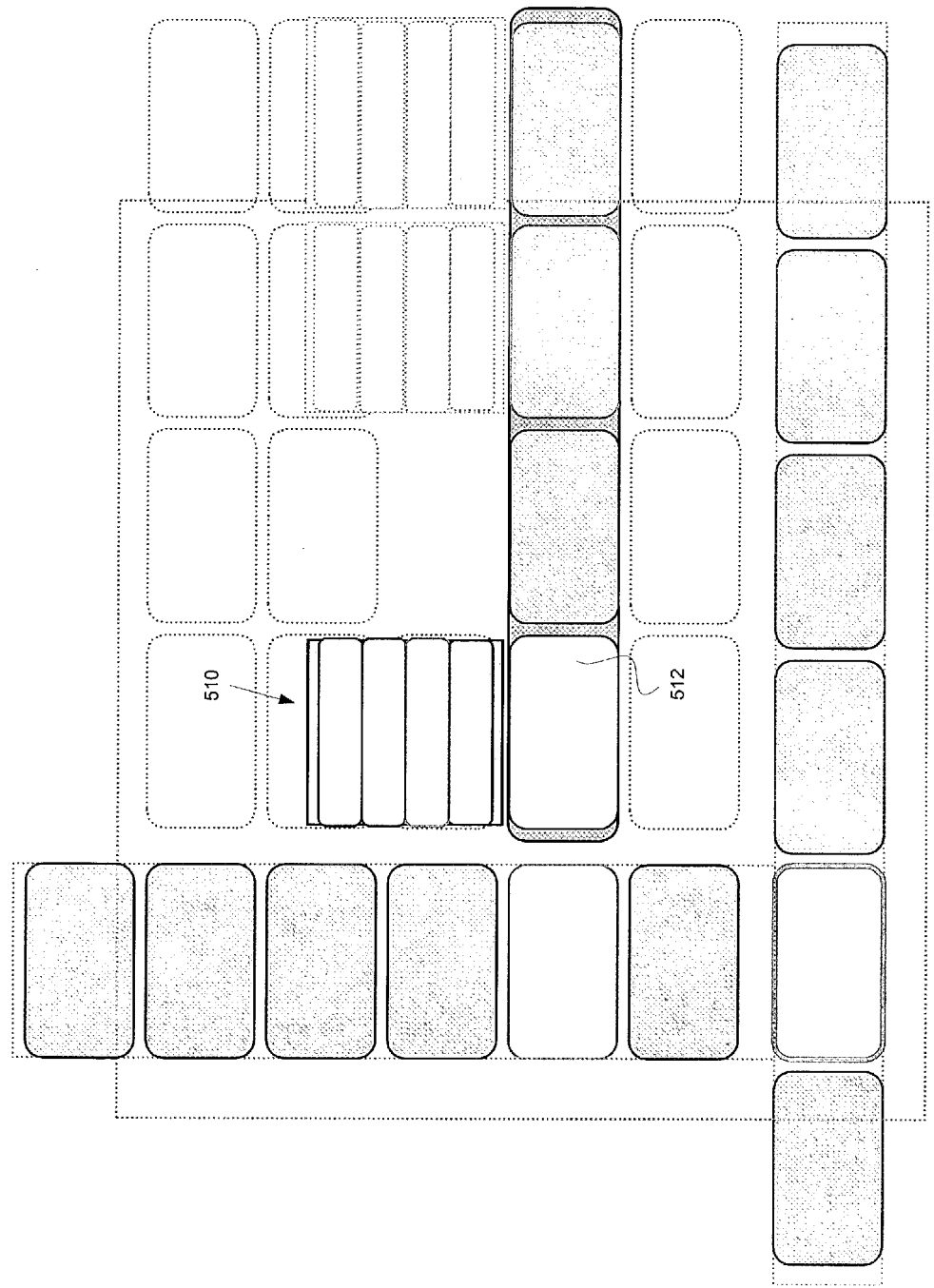

5A. Options and action folder 502 may display a list of selectable actions relating to information in a selected element. A selected action may further open a list of options that further define a selected action. Additional actions and options folders may also be linked to other focus pointers, such as options and actions folder 508 shown linked to focus pointer 506. FIG. 5B shows an alternative embodiment in which an options and actions folder 510 is linked to a focus pointer 512. Selecting OPTIONS key 406 a second time or BACK key 404 at any time of the scrolling options and actions folders 502, 506 or 510 will close the respective folder.

Figure 6A:
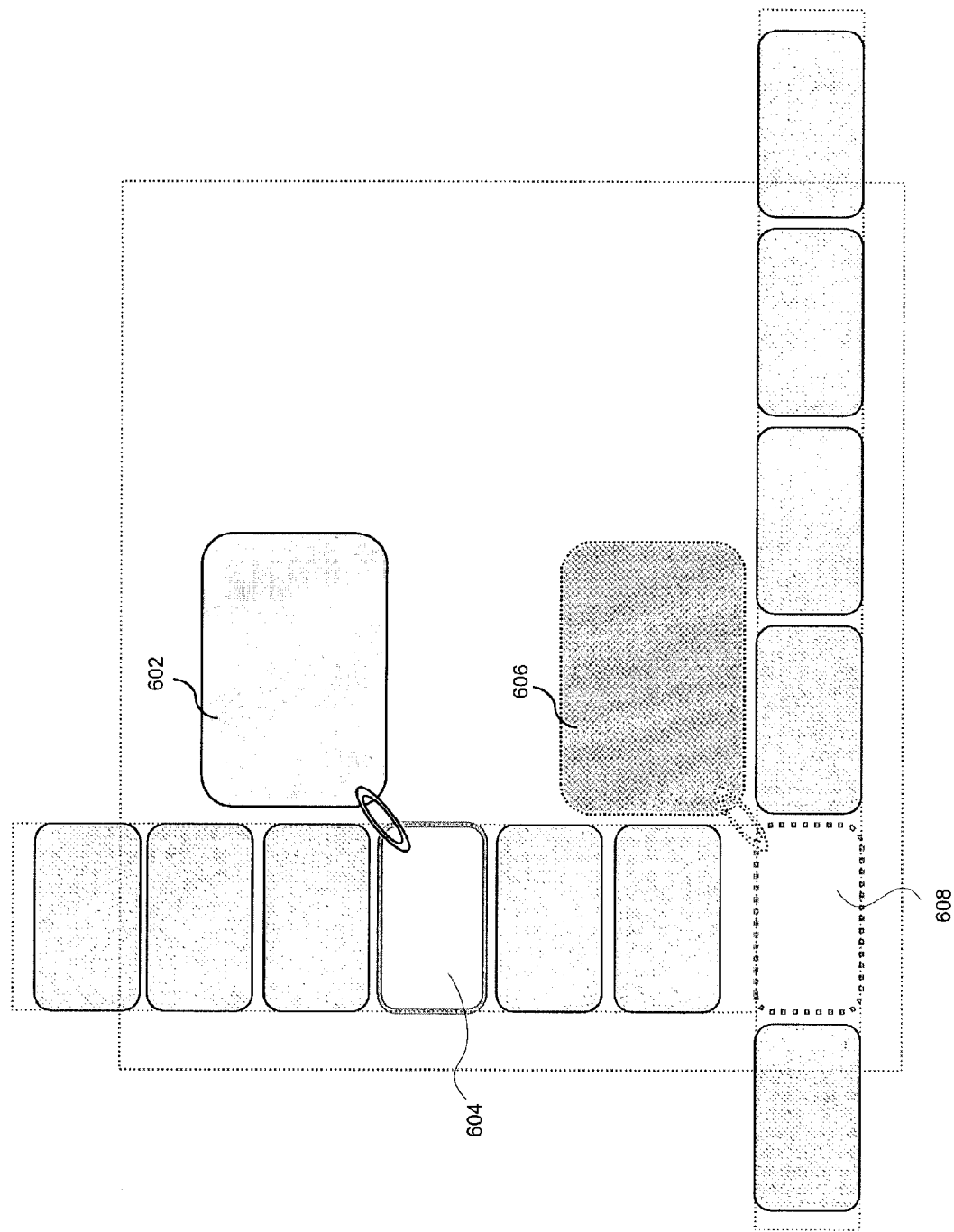
FIGS. 6A and 6B show embodiments in which an information folder appears next to a selected focus pointer, in accordance with an embodiment of the invention.
Figure 6B:
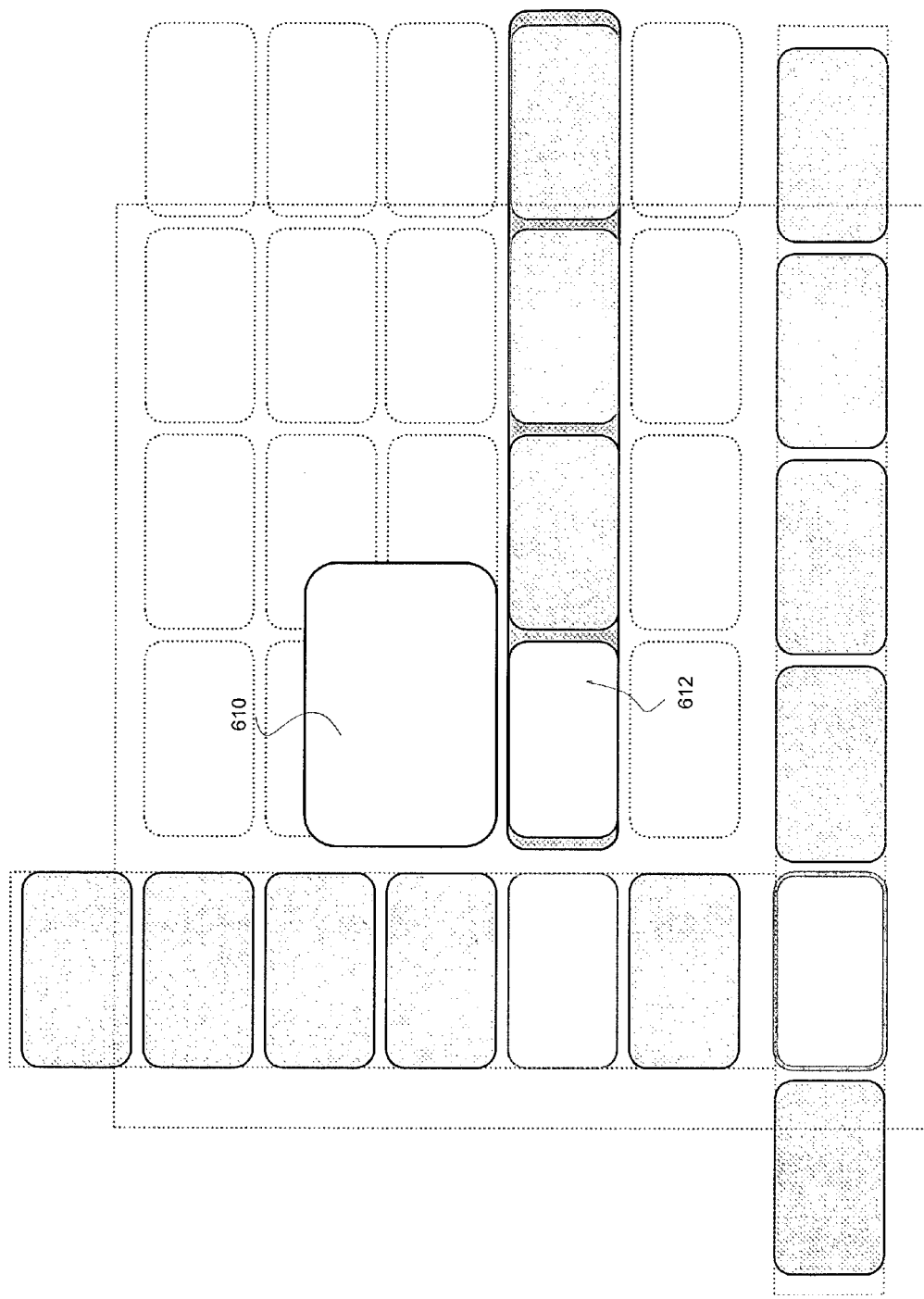

An INFO key 408 may be used to cause an information folder 602 to appear next to a selected focus pointer 604 so that information folder 602 and the focus pointer 604 are graphically linked together, as shown in FIG. 6A. Information folder 602 may display information relating to a selected item of information and may include one or more options and/or options. Additional information folders may also be linked to other focus pointers, such as information folder 606 shown linked to focus pointer 608 or information folder 610 linked to focus pointer 612 (shown in FIG. 6B). Selecting INFO key 408 a second time or BACK key 404 at any time of the viewing of information folders 602 or 606 will close the folder.

By using special keys, such as INFO key 408 and OPTIONS key 406 for information inquiry, only a predefined list of information is displayed. This way a large amount of information can be categorized and presented in predefined parts that are small and therefore easy to use.

Remote control device 400 may also include conventional navigational keys 410, 412, 414, 416 and 418 for navigating through a user interface.

Option and action folders and information folders may be available for at least most of the elements in any folder of the user interface hierarchy by using previously described means.

Figure 7:
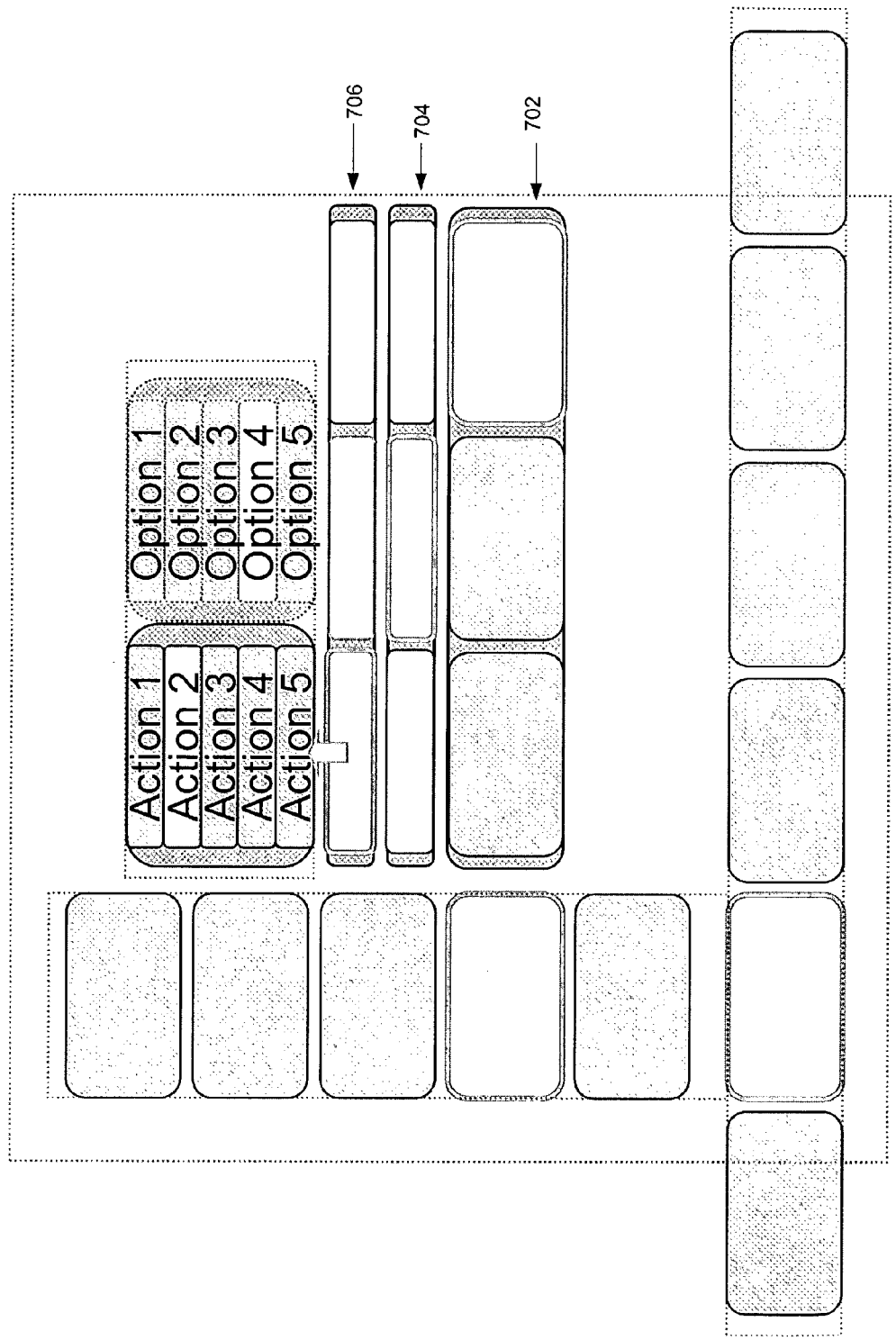
FIG. 7 illustrates an embodiment in which sequential folders are displayed horizontally, in accordance with an embodiment of the invention.
Figure 8:
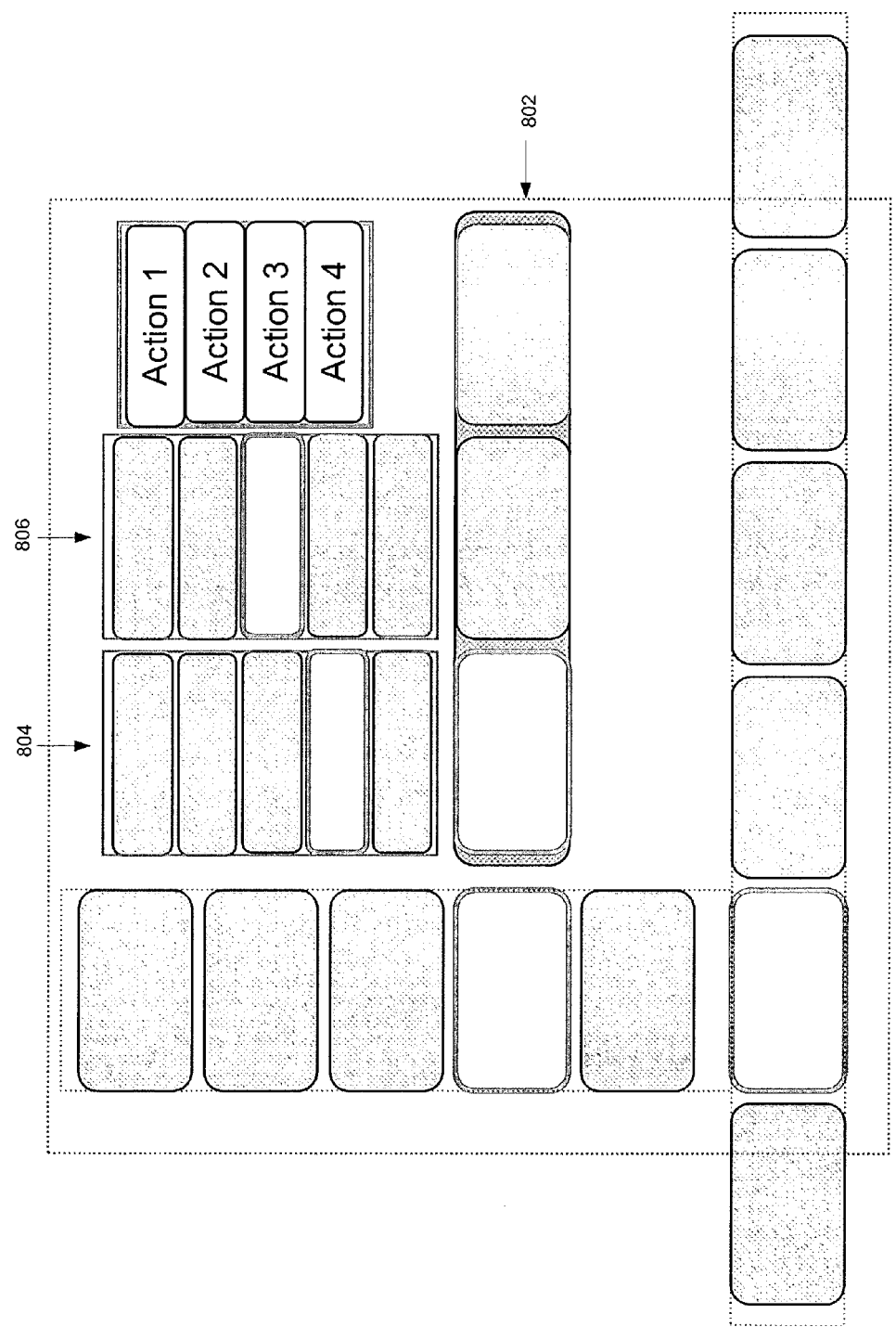
FIG. 8 illustrates an embodiment in which sequential folders are displayed vertically, in accordance with an embodiment of the invention.

The arrangement of folders is not limited to the embodiments described above. FIG. 7 illustrates an embodiment in which sequential folders 704 and 706 after second subfolder 702 are displayed horizontally. The horizontal display of subfolders may already be implemented after the main folder. FIG. 8 illustrates another embodiment in which sequential folders 804 and 806 after second subfolder 802 are displayed vertically. The vertical display of subfolders may already be implemented after the first sub folder. One skilled in the art will appreciate that aspects of the present invention may be used to create user interfaces having a variety of combinations of vertical and horizontal folders.

Figure 9:
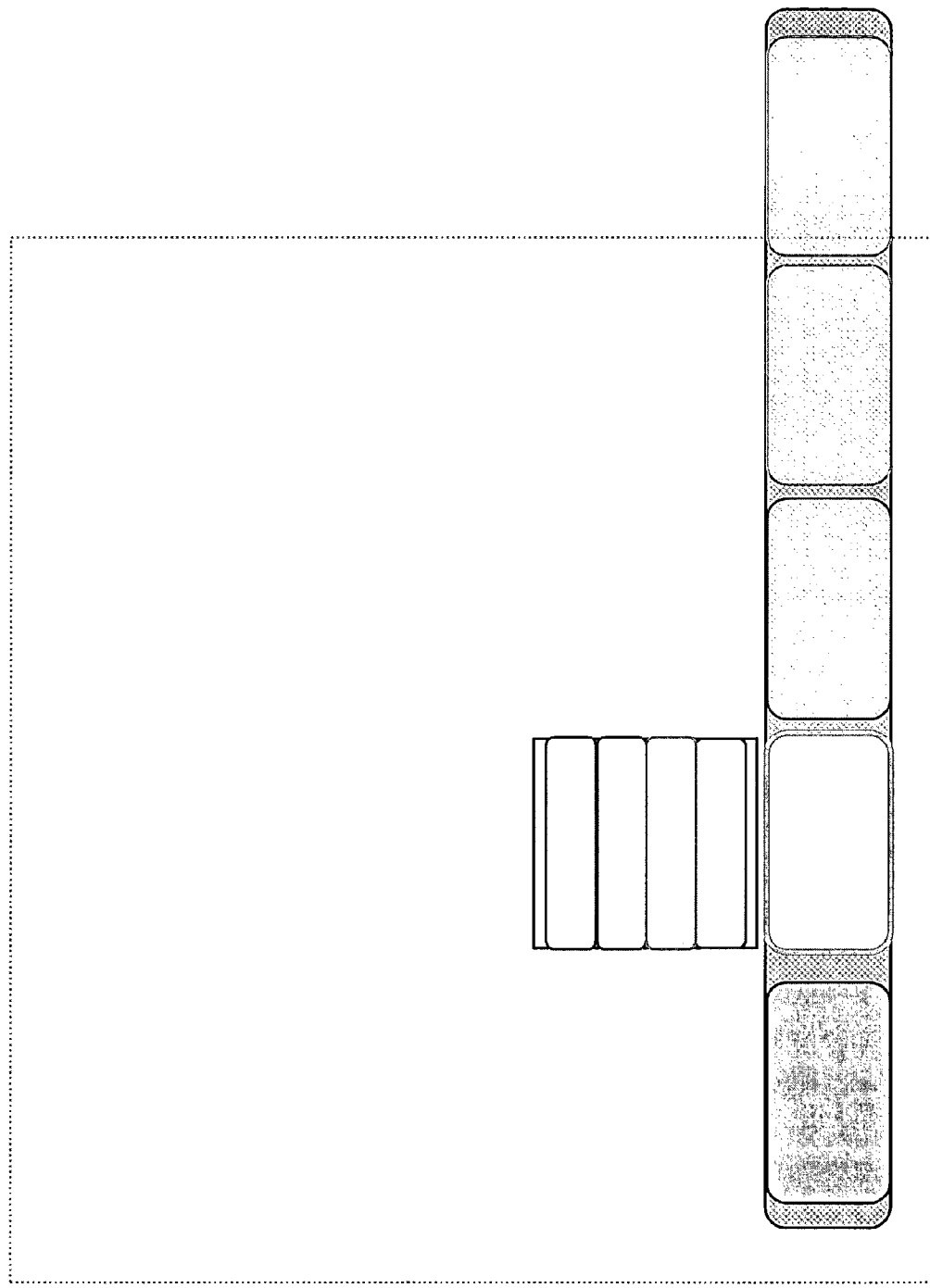
FIG. 9 illustrates an embodiment that presents a quick navigation mode.

FIG. 9 illustrates an embodiment that may be used during a quick navigation mode. In an illustrative embodiment, pressing for example an up key 416 or any other specified key on a remote control device 400 when a display does not show any level of menu hierarchy causes a third level horizontal folder 902 with or without a related focus pointer element 904 from a second level vertical bar to appear. Items of information that are related to the media currently presented are displayed as selectable elements of horizontal folder 902. The previously described menu functions may be available when using the quick navigation mode. For example, an options and actions folder 184 may be displayed when OPTION key 406 is selected. In other embodiments, selecting INFO key 408 may cause an information folder to appear next to a selected focus pointer. When the display does not show any level of menu hierarchy, pressing OPTION key 406 may open an options and actions folder related to the media currently presented on the display. Similarly, pressing INFO key 408 may open an information folder related to the media currently presented on the display.

Figure 10:
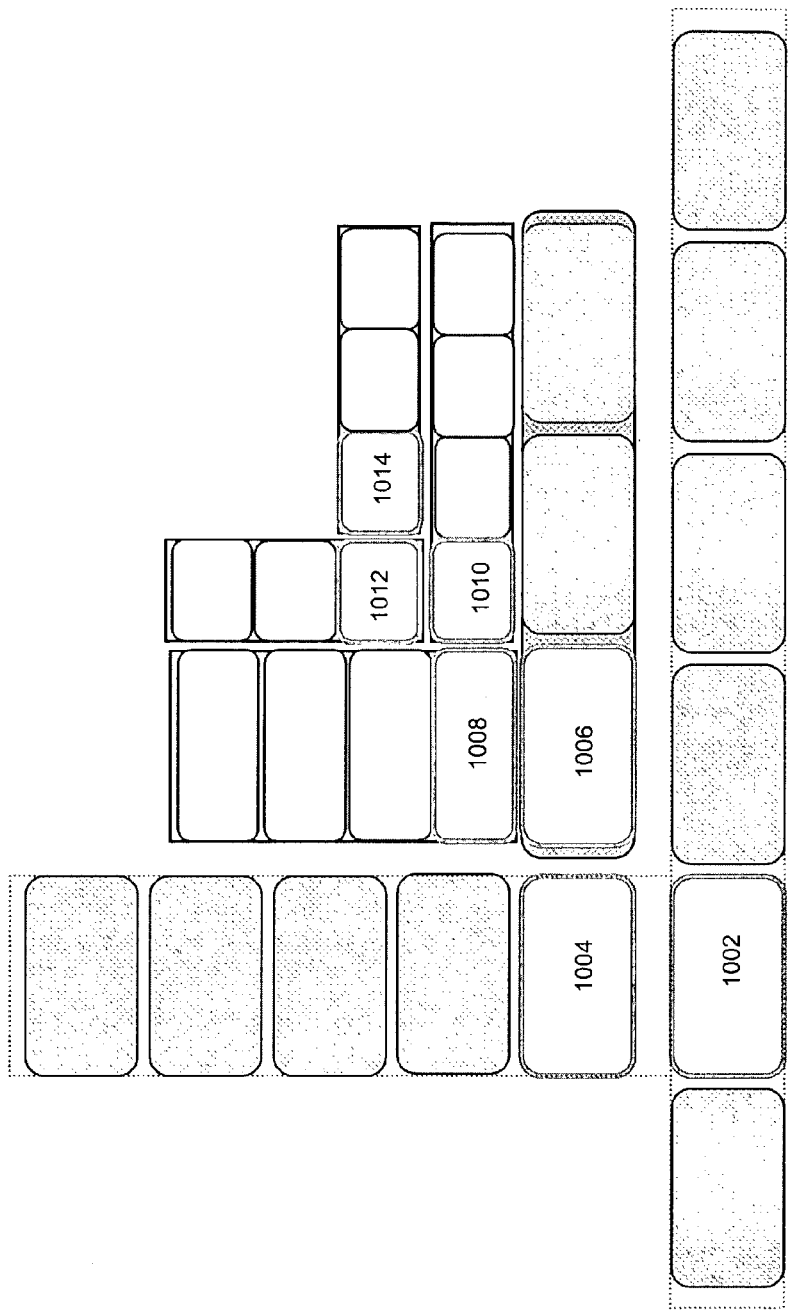
FIG. 10 illustrates an embodiment in which all focus pointers are fixed, in accordance with an embodiment of the invention.

FIG. 10 illustrates yet another embodiment in which the locations of all focus pointers 1002, 1004, 1006, 1008, 1010, 1012 and 1014 are fixed. Of course, in other embodiments a subset of the focus pointers may be fixed. The actual implementation may be selected based on the appearance of the elements within the subfolders or other criteria. The main folder may be located at any edge of a display area and sequential sub folders are then located relating to the main folder as described previously.

Figure 11A:
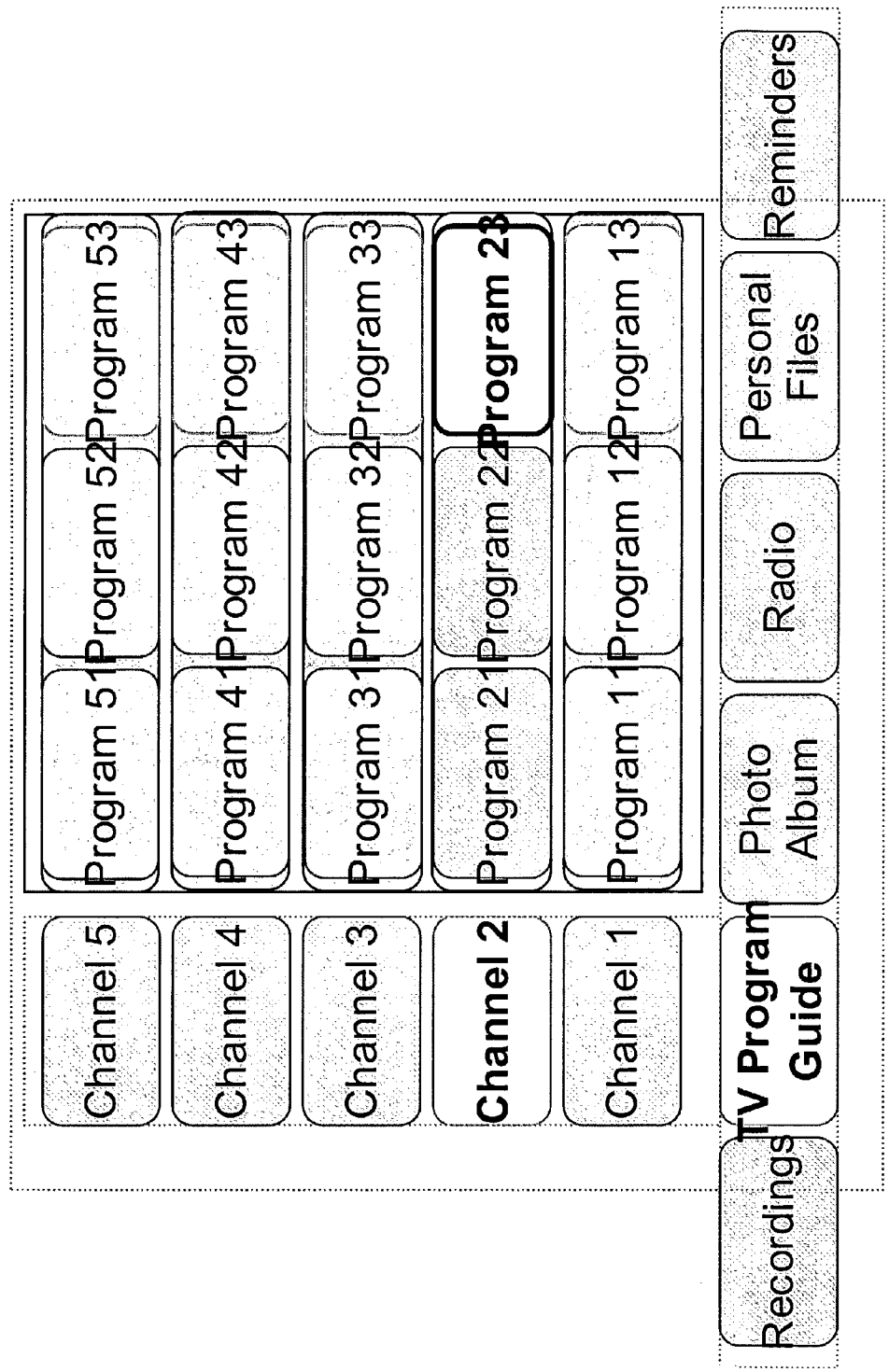
FIGS. 11A-11C illustrate electronic program guides, in accordance with embodiments of the invention.

Aspects of the present invention may be used to implement a variety of graphical user interfaces, such as electronic program guides (EPG) and interactive program guides (IPGs) displaying programs, channels, recordings, movies, sports, favorites, preferences or reminders, etc. FIG. 11A illustrates one exemplary electronic program guide, in which the content of an EPG is partitioned into elements that fit in the user interface structure described in embodiments of this invention. An EPG program matrix is displayed in the user interface together with the main folder and the first level subfolder wherein the first level subfolder displays elements that show channels. The EPG program matrix may show all the programs (elements) that are related to the channel information in the second subfolders at the same time, so that the user may move a focus pointer with arrow keys directly to a desired program (element) in the matrix without first selecting an appropriate channel (element) in the first subfolder. The shown content of the EPG program matrix may change according to selections that are made in main folder and in the first subfolder.

Figure 11B:
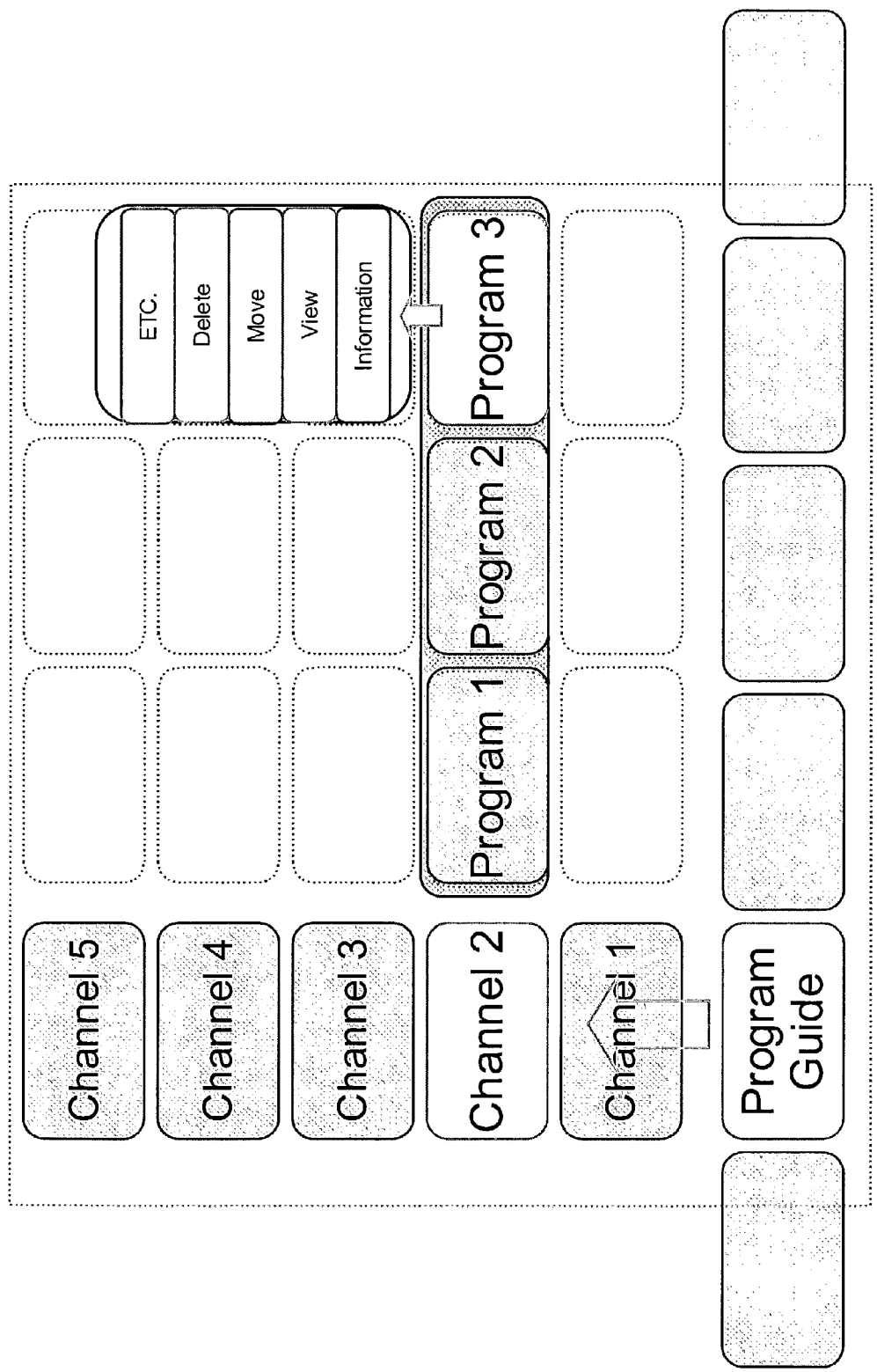
Figure 11C:
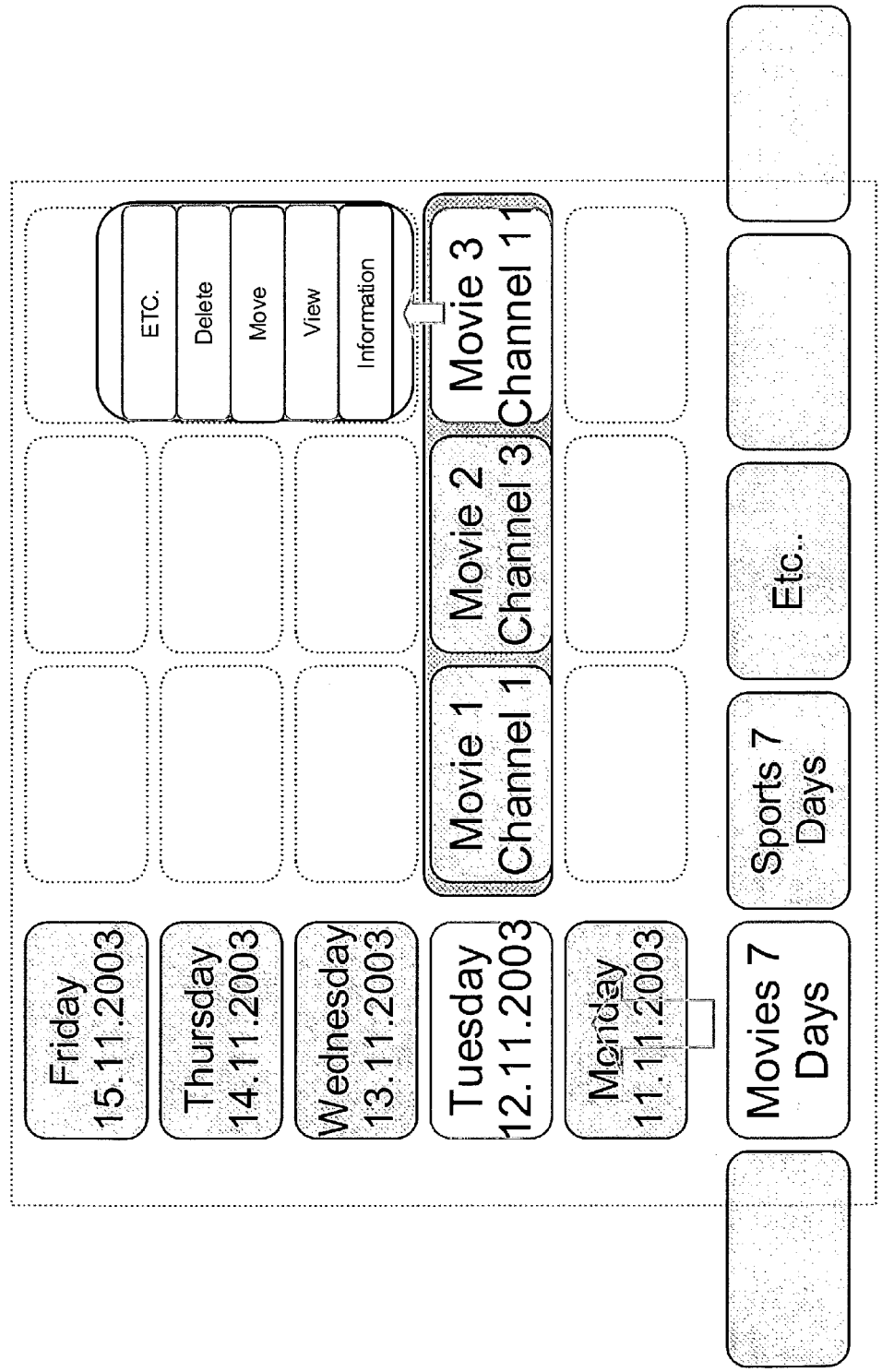

FIGS. 11B and 11C illustrate other exemplary electronic program guides (EPGs), in which the content of EPG may be partitioned to elements that are shown in folders in a manner described in the embodiments of this invention. The user interface may receive content for the electronic program guide (EPG) over-the-air (OTA) or from one or more wireline networks. In FIG. 11B, the first subfolder represents channels, the second subfolder represents programs and the third subfolder represents actions and options or information related to the selected program. In FIG. 11C the first subfolder represents days, the second subfolder represents programs and the third subfolder represents actions and options or information related to the selected program.

Aspects of the present invention may also be used to implement graphical user interfaces that organize such elements of content and information as photographs, personal files and archives, reminders, calendars, radio channels, satellite channels, email, internet links, databases, multimedia services (MMS), internet protocol data casting (IPDC), videos, email, personal information management (PIM), advertisements, coupons, electronic shopping and billing, internet, news groups, chat channels, games, gambling, etc. More specifically the above mentioned elements of content and information can be implemented in a user interface by following methods that were described with reference to FIGS. 11A, 11B and 11C. For example, in the case of photographs, elements in the first subfolder represent a list of titles or descriptions for a group of photographs, and elements in the second subfolder represent a list of actual photographs, and the third subfolder represents actions and options or information related to a selected photograph.

Figure 12:
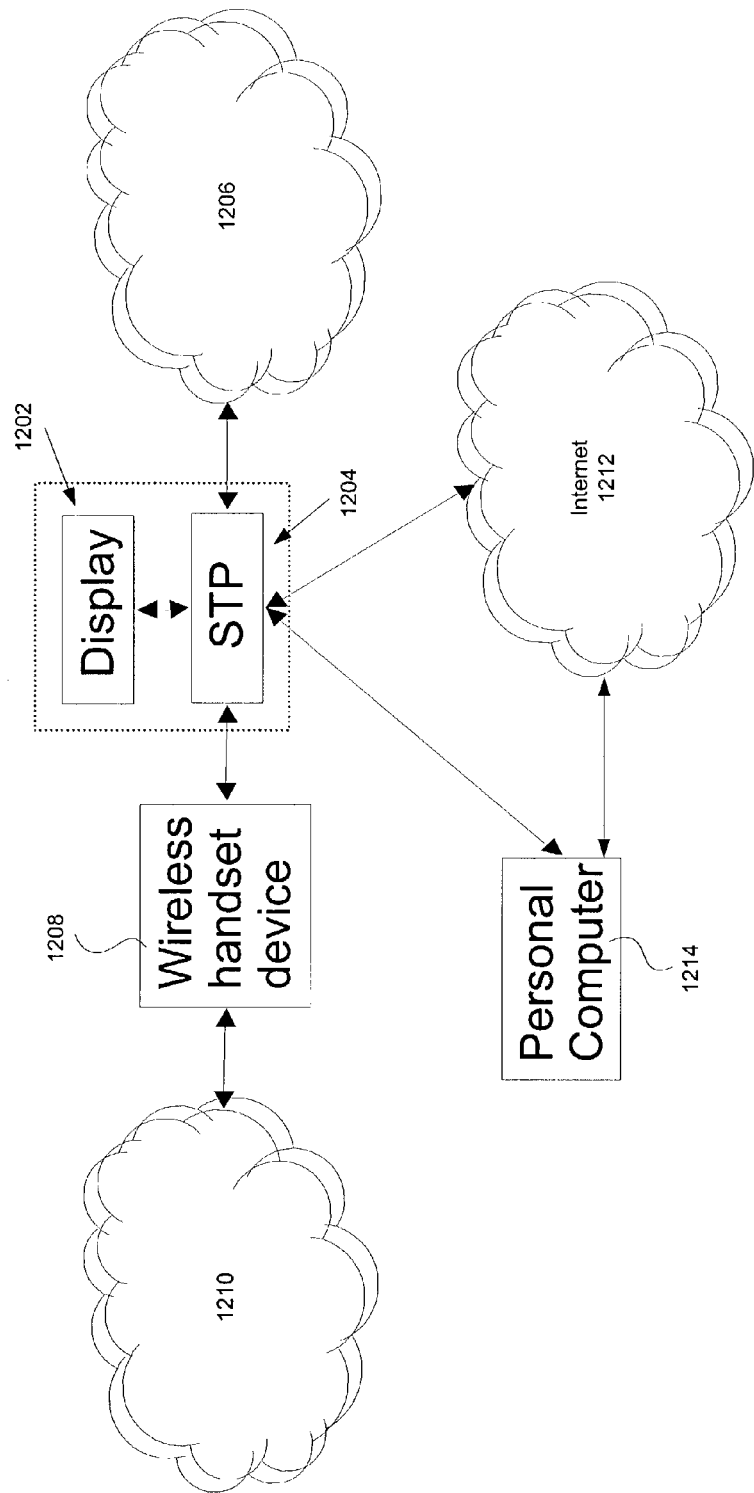
FIG. 12 illustrates a set-top box connected to networks, in accordance with an embodiment of the invention.

FIG. 12 illustrates an embodiment having several networks connected to a set-top box device 1204 and a display 1202, in accordance with an embodiment of the invention. The user interface may represent a plurality of types of information and messages that set-top box 1204 may receive from a plurality of service providers or individual persons via a plurality of networks and intermediary devices.

The type of information presented in set-top box 1204 may comprise electronic program guides (EPGs). Alternatively, several other types of information and messages may by presented alone or with any other type of information and messages, such as electronic service guides (ESGs), interactive program guides (IPGs), TV channels, satellite TV channels, Pay TV, movie channels, analog radio channels, digital audio broadcasting (DAB), multimedia services (MMS), internet protocol data casting (IPDC), photos, pictures, videos, emails, personal files, calendar information, personal information management (PIM), advertisements, coupons, electronic shopping and billing, internet, news groups, chat channels, games, gambling etc.

Set-top box 1204 may receive information, messages and media content over-the-air (OTA) for example from a DVB network 1206, an analog TV network (not shown) or a satellite TV network (not shown) or the Internet 1212. Information, messages and media content may also be received from a wireless handset device 1208 over any wireless short range networks or over-the-air (OTA), such as Bluetooth, WLAN, Wi-Fi or infrared link, etc., from any wireless network 1210 or over-the-air (OTA), such as a wireless telecom network, WLAN, Bluetooth, WLAN, Wi-Fi, infrared link or wireless Internet networks, etc. Information, messages and media content may also be received from a personal computer (PC) 1214 over Bluetooth, WLAN, LAN, Wi-Fi, infrared link or over-the-air (OTA), etc., from any wireline network, such as the Internet 1212, LAN or PSTN, etc. Moreover, in some embodiments, information, messages and media content may be received from one or more memory modules within personal computer 1214 and/or wireless handset device 1208.

Every type of information and messages may receive a special identification (ID) code based on one or any combination of content, sender information, origin, intermediary device, intermediary network, or any other meta data information. The user interface may be configured to recognize the ID code and, based on that code, place the information or message to the right context and location in the user interface folder hierarchy.

Figure 13:
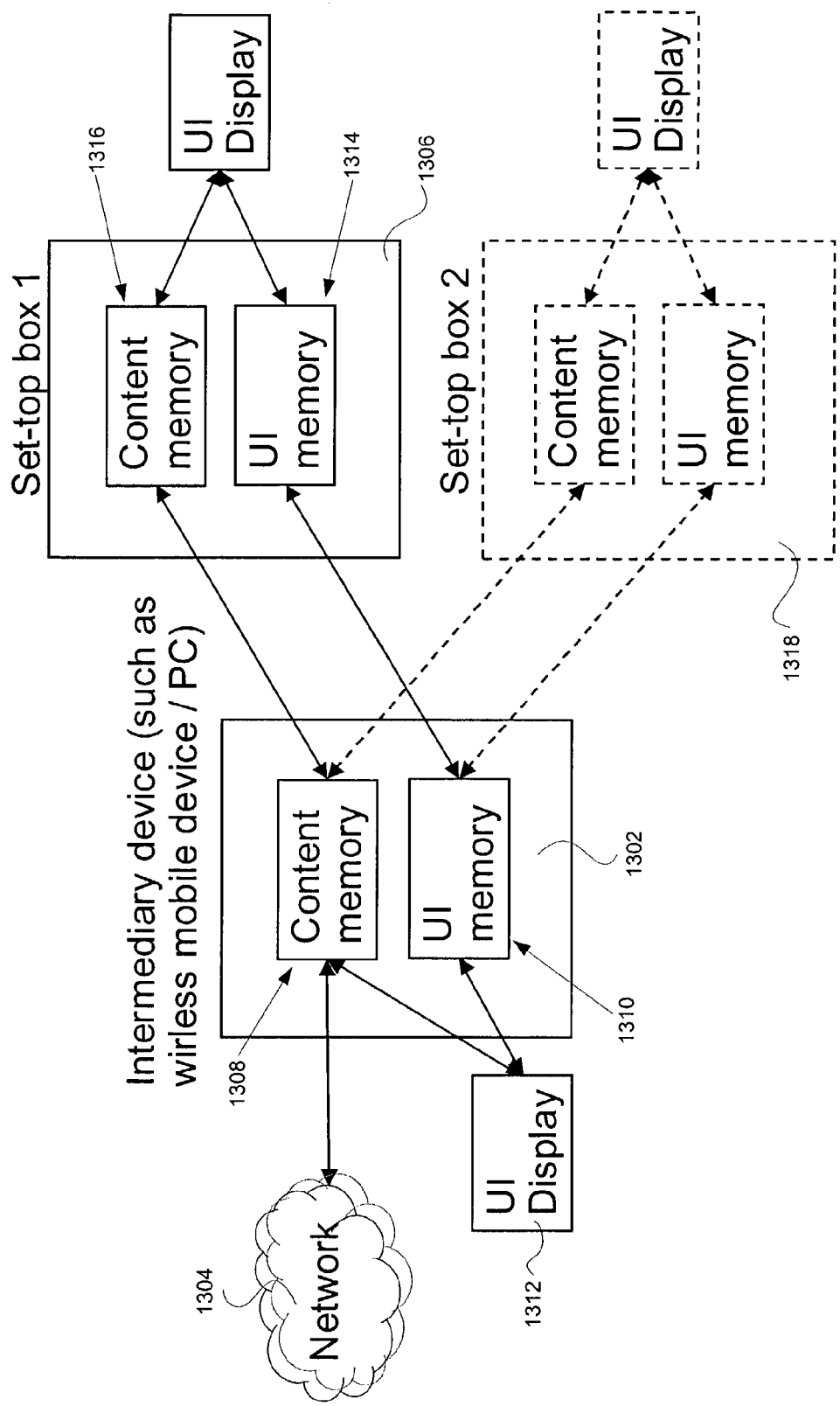
FIG. 13 illustrates an intermediary device connected to a network and a set-top box, in accordance with an embodiment of the invention.

FIG. 13 illustrates an intermediary device 1302 connected to a network 1304 and a set-top box 1306, in accordance with an embodiment of the invention. Intermediary device 1302 may be implemented with a wireless handset device, a personal computer (PC) device or any other device that may operate as a remote control device for set-top box 1306. The use of intermediary device 1302 may be especially useful when a set-top box receives information and messages via a wireless handset device over Bluetooth, WLAN, Wi-Fi, infrared link or over-the-air (OTA), etc. or from any other wireless network or from a content memory unit 1308 or UI memory unit 1310 of intermediary device 1302, or via a personal computer over cable, LAN, Bluetooth, WLAN, Wi-Fi, infrared link, over-the-air (OTA) etc. from any of the networks or personal computer 1214 (shown in FIG. 12).

Intermediary device 1302 may be one of the following: wireless mobile telephone, personal digital assistant (PDA), handheld PC, Pocket PC, palmtop device, mobile display device, portable screen, electronic book, or any other wireless device that transmits information and messages between a set-top box and that device.

When intermediary device 1302 is implemented with a personal computer (PC) device, the device may be one of the following: desktop PC, laptop PC, handheld PC, network server or any device that has functionalities of a computer and that transmits information and messages between a set-top box and that device.

Intermediary device 1302 may have one or more internal memory units, a display 1312 and a user interface. Content memory 1308 stores the information and messages that intermediary device 1302 receives from a network. After receiving the information and messages intermediary device 1302 may immediately transmit the information and messages to set-top box 1306 with or without storing it first to one of its memory units, such as content memory 1308. Alternatively the information and messages are first stored in one of the memory units for later transmit, e.g. if the device is not in the vicinity of set-top box 1306 or if it is switched off.

In one embodiment, intermediary device 1302 may work in a manner similar to remote control device 400 described above and may include a display device.

In one alternative embodiment, intermediary device 1302 may more actively control set-top box 1306. For example, intermediary device 1302 may have a UI memory unit 1314 for storing a partial or complete UI content and structure used in set-top box 1306. Memory unit 1314 can store more than one UI's and from several set-top box units. In this embodiment, set-top box 1306 communicates, transmits and updates the content and structure of the UI with the intermediary device 1302 via previously described networks. The content of UI memory unit 1314 may be combined with a content memory 1316 and presented in a UI display unit. UI memory 1314 and content memory 1316 may be the same memory unit.

Intermediary device 1302 may present on its display 1312 a complete or partial presentation of the user interface stored and represented in set-top box 1306 in a same format, structure and with same functionality as described previously, or in a different format, structure and with different functionality that better suit the device capabilities.

Information or messages may be transmitted from set-top box 1306 to intermediary device 1302 for further usage in another environment, or for storage, or for manipulation, etc. For example, photos may be manipulated by a picture manipulator program in a PC. The information or messages may further be transmitted back to set-top box 1306.

In one embodiment of the invention intermediary device 1302 may download information and messages, and/or a complete or partial user interface structure from a set-top box to one of its memory units, and later transmit the information and messages with or without the complete or partial user interface structure for presentation to some other set-top box, such as set-top box 1318, that may have a user interface similar to that in set-top box 1306. Alternatively, user interfaces from the user's device and some other set-top box may combine to construct a new user interface, or alternative the user interface from the user's device may replace the user interface in a some other set-top box as long as the user uses the other set-top box. Alternatively, the other set-top box can be used with its own user interface. The other set-top box may be e.g. in a hotel room, in summer cottage, in a friend's place, at work, in a train, in a car, in an airplane, etc.

Figure 14:
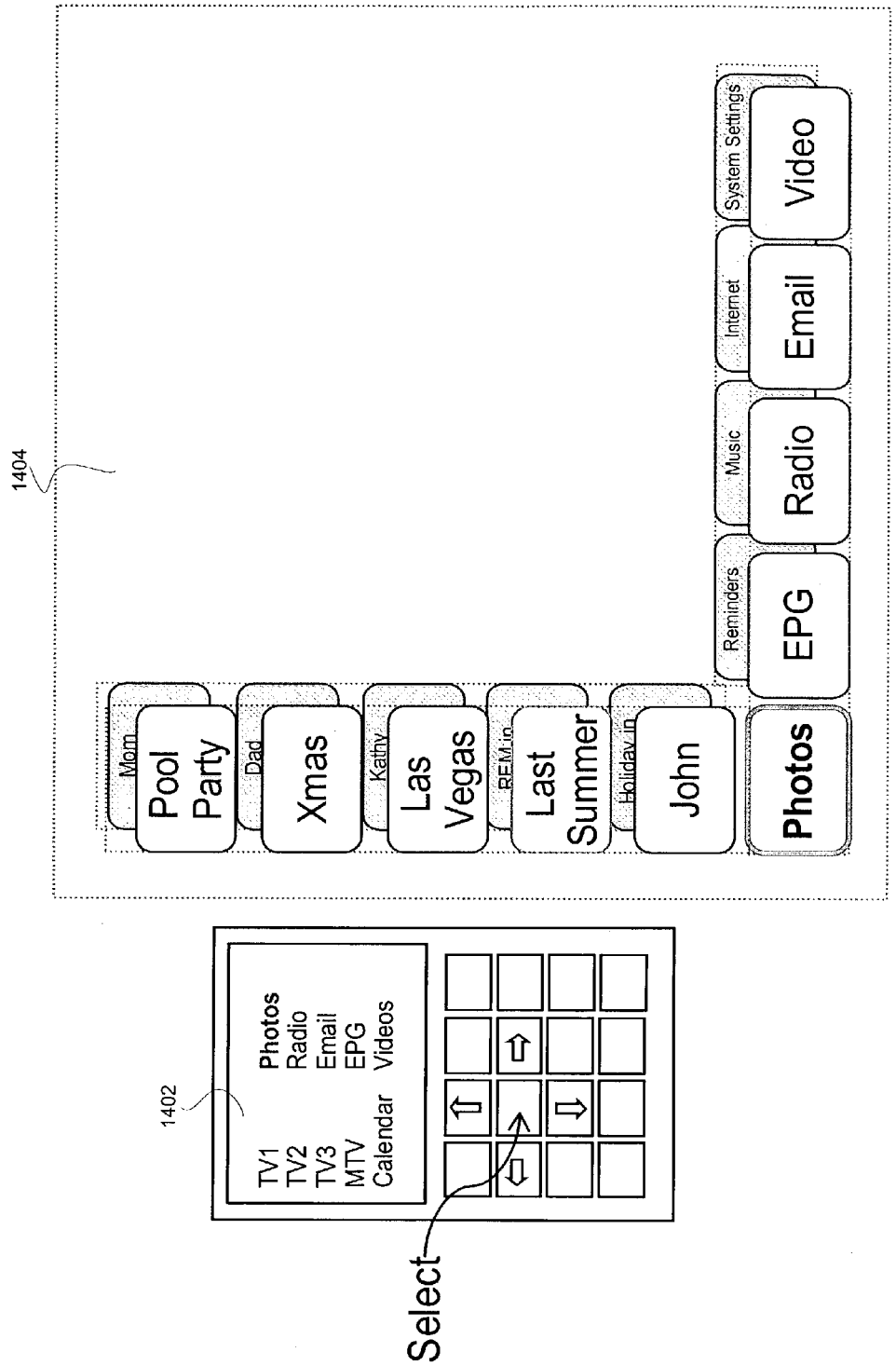
FIG. 14 illustrates a wireless device connected to a user interface in accordance with an embodiment of the invention.

FIG. 14 illustrates a wireless device 1402 connect. One or more devices, such as wireless devise 1402 or PCs, can work as a remote control device for one single set-top box or for any set-top box if not restricted to one or more specific devices by a means in a set-top box.

In one embodiment of the invention a user may have photos from a business trip to CeBit stored in her wireless device. At work she may connect wireless device 1402 to one of the set-top boxes in the office, control the set-top boxes with the user interface stored in wireless device 1402 via Bluetooth, via some other wireless network or over-the-air (OTA), transmit the photos to the set-top box for presentation via Bluetooth, via some other wireless network or over-the-air (OTA). If the content is not stored in wireless device 1402 it can be requested from some other storage unit in any network using the set-top box by the user's own user interface. One or more of the photos transmitted to the set-top box may be stored in one of the memory units in the set-top box, or may be deleted automatically or by user's requests. Those skilled in the art will appreciate that many other content or information may be handled by the same way. After a new user interface and/or new information and messages are transmitted from an intermediary device and stored in a second set-top box, it can be controlled by the following three ways:

1) By a remote control device of the second set-top box

2) By the intermediary device that transmitted the new UI and information

3) By both the remote control device and intermediary device simultaneously.

Case 1) refers to ordinary usage of the set-top box device. In case 2) the intermediary device may represent on its own display a partial or complete UI especially if the display is capable of representing the UI. A user scrolls the UI structure in her device and the device sends commands to the second set-top box according to the user's selection. The UI structure may or may not be shown also on a display connected to the set-top box. Case 3) is similar to case 2), with the addition that the remote control device of the second set-top box can also be used. The UI structure is shown on the display connected to the set-top box and on the display of the intermediary device. Both UI displays are updated simultaneously.

The disclosed methods and apparatuses for selecting or adjusting services or settings of an electronic device on a display of the electronic device are suitable for many different electronic devices, such as personal computers (PCs), set-top boxes (STBs) digital video disc (DVD) players, video cassette recorders (VCRs), digital video recorders (DVRs), personal video recorders (PVRs), TVs, multimedia terminals, satellite receivers, digital cameras, video game consoles, digital TVs, domestic appliances, wireless telecom devices, personal digital assistants (PDAs), smart handheld device, Pocket PCs, mobile display appliances, electronic books etc.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed:

1. An apparatus comprising:
    a display generator configured to generate a user interface comprising:
        a main folder containing a plurality of elements that are displayed linearly along a first axis;
        at least a first sequential subfolder containing a plurality of elements linked to the main folder, wherein the plurality of elements of the first sequential subfolder is displayed linearly along a second axis;
        a fixed focus pointer configured to select one of the plurality of elements of the main folder in response to interaction of a user; and
        at least one moveable focus pointer configured to be movable over the plurality of elements of the at least first sequential subfolder to select one of the plurality of elements of the first sequential subfolder in response to interaction of a user thereby causing at least a second sequential subfolder to be displayed, wherein the at least one second sequential folder contains a plurality of elements linked to the at least one first sequential subfolder such that the plurality of elements of the main folder, the plurality of elements of the at least one first sequential subfolder, and the plurality of elements of the at least one second sequential subfolder are concurrently displayable, wherein the plurality of elements of the second sequential subfolder are displayed linearly along a third axis that is non-parallel with the second axis.

2. The apparatus of claim 1, wherein the main folder and the at least first sequential subfolder are scrollable.

3. The apparatus of claim 1, wherein the elements of the first sequential subfolder are presented in a form of a carousel.

4. The apparatus of claim 3, wherein the carousel rotates on an axis.

5. The apparatus of claim 3, wherein the elements in the carousel are selectable.

6. The apparatus of claim 1, wherein the plurality of elements of the main folder and the at least first subfolder comprise icons.

7. The apparatus of claim 1, wherein the plurality of elements of the main folder and the at least first subfolder comprise text.

8. The apparatus of claim 1, wherein the user interface further includes a third subfolder containing a plurality of elements and linked to the second subfolder.

9. The apparatus of claim 8, wherein the third subfolder is displayed parallel to the second subfolder.

10. The apparatus of claim 8, wherein the plurality of elements of the third subfolder is displayed perpendicular to the plurality of elements of the second subfolder.

11. The apparatus of claim 1, further including a wireless interface module configured to receive signals carrying interaction information from the user.

12. The apparatus of claim 1, wherein the first sequential folder is arranged perpendicular to the second sequential folder.

13. The apparatus of claim 1, wherein elements selected by the at least one moveable focus pointer change appearance.

14. The apparatus of claim 1, wherein the element selected by the fixed focus pointer changes appearance.

15. The apparatus of claim 1, wherein the elements in the main folder comprise media types and the elements in the first sequential subfolder comprise choices corresponding to the selected media type and the elements in the second sequential subfolder comprise definitions of appearance of the choices corresponding to the selected media types and elements in a third sequential subfolder comprise predefined actions and functions folder or information folder available to each appearance of choices.

16. The apparatus of claim 1, wherein the user interface is configured to receive content of an electric program guide (EPG) over-the-air (OTA).

17. The apparatus of claim 1, wherein the user interface is configured to receive content over the air (OTA).

18. The apparatus of claim 1, wherein the user interface is configured to receive content over a wireline network.

19. The apparatus of claim 1, wherein the user interface is configured to receive content via a wireless handset device over a wireless short-range network.

20. The apparatus of claim 1, wherein the user interface is configured to receive content from a memory unit in a wireless handset device over a wireless short-range network.

21. The apparatus of claim 1, wherein the user interface is configured to receive content via a personal computer over a wireless short-range network.

22. The apparatus of claim 1, wherein the user interface is configured to receive content via a personal computer over a wireline network.

23. The apparatus of claim 1, wherein the user interface is configured to receive content from a memory unit in a personal computer over a wireless short-range network.

24. The apparatus of claim 1, wherein the user interface is configured to receive content from a memory unit in a personal computer over a wireline network.

25. The apparatus of claim 1, wherein the plurality of elements in the first sequential subfolder represent television channels.

26. The apparatus of claim 1, wherein the plurality of elements in the first sequential subfolder represent days.

27. The apparatus of claim 25, wherein the plurality of elements in the second sequential subfolder represent television programs.

28. The apparatus of claim 27 wherein the plurality of elements in the second sequential subfolder are all presented at the same time in the form of a matrix.

29. The apparatus of claim 28, wherein the elements in the matrix are selectable without selecting the first sequential subfolder first.

30. The apparatus of claim 27 further including a plurality of elements in a third sequential subfolder that represent an actions and options folder.

31. The apparatus of claim 27 further including a plurality of elements in a third sequential subfolder that represent an information folder.

32. The apparatus of claim 1, wherein the plurality of elements in the first sequential subfolder represent photographs.

33. The apparatus of claim 32, wherein the plurality of elements in the second sequential subfolder represent photographs.

34. The apparatus of claim 1, wherein the plurality of elements represent Internet links.

35. The apparatus of claim 1, wherein only a third subfolder of the user interface containing a plurality of selectable elements related to a media on display of the display device is displayed when invoked by a user.

36. The apparatus of claim 1, wherein the apparatus comprises a set-top box (STB).

37. The apparatus of claim 1, wherein the apparatus comprises a personal computer.

38. The apparatus of claim 1, wherein the apparatus comprises a wireless device.

39. The apparatus of claim 1, wherein the elements of one of the first sequential subfolder and the main folder are presented as a first sequence of linearly arranged elements aligned along the first axis or the second axis and a second sequence of linearly arranged elements are aligned along a fourth axis that is parallel to the first axis or to the second axis, wherein one or more of the first sequence of linearly arranged elements are respectively presented at least partially overlapping at least one of the elements of the second sequence of linearly arranged elements.

40. The apparatus of claim 39, wherein the first sequence of linearly arranged elements and the second sequence of linearly arranged elements are scrollable together.

41. The apparatus of claim 40, wherein information of content of elements is visible.

42. The apparatus of claim 41, wherein the elements in the main folder, the first sequential subfolder, and the second sequential subfolder are selectable.

43. A method comprising:
   displaying a main folder containing a plurality of elements that are displayed linearly along a first axis;
   displaying at least a first sequential subfolder containing a plurality of elements linked to the main folder, wherein the plurality of elements of the first sequential subfolder is displayed linearly along a second axis;
   providing a fixed focus pointer configured to select one of the plurality of elements of the main folder in response to interaction of a user; and
   providing at least one moveable focus pointer configured to be movable over the plurality of elements of the at least first sequential subfolder to select one of the plurality of elements of the first sequential subfolder in response to interaction of a user thereby causing at least a second sequential subfolder to be displayed, wherein the at least one second sequential folder contains a plurality of elements linked to the at least one first sequential subfolder such that the plurality of elements of the main folder, the plurality of elements of the at least one first sequential subfolder, and the plurality of elements of the at least one second sequential subfolder are concurrently displayable, wherein the plurality of elements of the second sequential subfolder are displayed linearly along a third axis that is non-parallel with the second axis.

44. The method of claim 43, wherein the main folder and the at least a first sequential subfolder are scrollable.

45. The method of claim 43, further comprising presenting the elements of the first sequential subfolder in a form of a carousel.

46. The method of claim 45, further comprising rotating the carousel on its axis.

47. The method of claim 45, wherein the elements in the carousel are selectable.

48. The method of claim 43, further comprising providing a wireless interface module configured to receive signals carrying interaction information to the user.

49. The method of claim 43, wherein the sequential subfolders are arranged perpendicular to each other.

50. The method of claim 43, further comprising receiving content of an electronic program guide (EPG) to the user interface over-the-air (OTA).

51. The method of claim 43, further comprising receiving content for the user interface over a wireline network.

52. The method of claim 43, further comprising receiving content for the user interface via a wireless handset device over a wireless short-range network.

53. The method of claim 43, further comprising receiving content for the user interface from a memory unit in a wireless handset device over a wireless short-range network.

54. The method of claim 43, further comprising receiving content for the user interface via a personal computer over a wireless short range network.

55. The method of claim 43, further comprising receiving content for the user interface via a personal computer over a wireline network.

56. The method of claim 43, further comprising receiving content for the user interface from a memory unit in a personal computer over a wireless short range network.

57. The method of claim 43, further comprising receiving content for the user interface from a memory unit in a personal computer over a wireline network.

58. The method of claim 43, further comprising displaying only a third subfolder of the user interface containing a plurality of selectable elements related to a media on the display of the display device when invoked by a user.

59. The method of claim 43, further comprising transmitting the user interface to a first apparatus.

60. The method of claim 59, further comprising transmitting content to the first apparatus.

61. The method of claim 59, further comprising further transmitting the user interface to a second apparatus.

62. The method of claim 61, further comprising further transmitting content to the second apparatus.

63. The method of claim 59, wherein the first apparatus comprises a personal computer or a wireless terminal.

64. The method of claim 61, wherein the second apparatus comprises a set-top box.

65. The method of claims 59, further comprising transmitting the user interface via over-the-air (OTA) or a wireline network.

66. The method of claims 60, further comprising transmitting content via over-the-air (OTA) or a wireline network.

67. The method of claim 43, wherein the elements of one of the first sequential subfolder and the main folder are presented as a first sequence of linearly arranged elements aligned along the first axis or the second axis and a second sequence of linearly arranged elements are aligned along a fourth axis that is parallel to the first axis or to the second axis, wherein one or more of the first sequence of linearly arranged elements are respectively presented at least partially overlapping at least one of the elements of the second sequence of linearly arranged elements.

68. The method of claim 67, wherein the first sequence of linearly arranged elements and the second sequence of linearly arranged elements are scrollable together.

69. The method of claim 68, wherein information of content of elements is visible.

70. The method of claim 69, wherein the elements in the main folder, the first sequential subfolder, and the second sequential subfolder are selectable.

71. An apparatus comprising a processor and a computer readable medium containing executable instructions that, when executed by the processor, perform:
displaying a main folder containing a plurality of elements that are displayed linearly along a first axis;
displaying at least a first sequential subfolder containing a plurality of elements linked to the main folder, wherein the plurality of elements of the first sequential subfolder is displayed linearly along a second axis;
providing a fixed focus pointer configured to select one of the plurality of elements of the main folder in response to interaction of a user; and
providing at least one moveable focus pointer configured to be movable over the plurality of elements of the at least first sequential subfolder to select one of the plurality of elements of the first sequential subfolder in response to interaction of a user thereby causing at least a second sequential subfolder to be displayed, wherein the at least one second sequential folder contains a plurality of elements linked to the at least one first sequential subfolder such that the plurality of elements of the main folder, the plurality of elements of the at least one first sequential subfolder, and the plurality of elements of the at least one second sequential subfolder are concurrently displayable, wherein the plurality of elements of the second sequential subfolder are displayed linearly along a third axis that is non-parallel with the second axis.

72. The apparatus of claim 71, wherein the computer readable medium contains additional computer executable instructions that, when executed by the processor, perform: presenting the elements of the first sequential subfolder in a form of a carousel.

73. The apparatus of claim 72, wherein the computer readable medium contains additional computer executable instructions that, when executed by the processor, perform: rotating the carousel on its axis.

74. The apparatus of claim 71, wherein the sequential subfolders are arranged perpendicular to each other.

75. The apparatus of claim 71, wherein the computer readable medium contains additional computer executable instructions that, when executed by the processor, perform: receiving content for the user interface via a wireless handset device over a wireless short-range network.

76. The apparatus of claim 71, wherein the computer readable medium contains additional computer executable instructions that, when executed by the processor, perform: receiving content for the user interface from a memory unit in a wireless handset device over a wireless short-range network.

77. The apparatus of claim 71, wherein the computer readable medium contains additional computer executable instructions that, when executed by the processor, perform: transmitting the user interface to a first apparatus.

78. The apparatus of claim 77, wherein the computer readable medium contains additional computer executable instructions that, when executed by the processor, perform: transmitting content to the first apparatus.

79. The apparatus of claim 77, wherein the computer readable medium contains additional computer executable instructions that, when executed by the processor, perform: further transmitting the user interface to a second apparatus.

80. The apparatus of claim 79, wherein the computer readable medium contains additional computer executable instructions that, when executed by the processor, perform: further transmitting content to the second apparatus.

81. The apparatus of claim 77, wherein the first apparatus comprises a personal computer or a wireless terminal.

82. The apparatus of claim 79, wherein the second apparatus comprises a set-top box.

83. The apparatus of claim 77, wherein the computer readable medium contains additional computer executable instructions that, when executed by the processor, perform: transmitting the user interface via over-the-air (OTA) or a wireline network.

84. The apparatus of claim 78, wherein the computer readable medium contains additional computer executable instructions that, when executed by the processor, perform: transmitting content via over-the-air (OTA) or a wireline network.

85. The apparatus of claim 71, wherein the elements of one of the first sequential subfolder and the main folder are presented as a first sequence of linearly arranged elements aligned along the first axis or the second axis and a second sequence of linearly arranged elements are aligned along a fourth axis that is parallel to the first axis or to the second axis, wherein one or more of the first sequence of linearly arranged elements are respectively presented at least partially overlapping at least one of the elements of the second sequence of linearly arranged elements.

86. The apparatus of claim 85, wherein the first sequence of linearly arranged elements and the second sequence of linearly arranged elements are scrollable together.

87. The apparatus of claim 86, wherein information of content of elements is visible.

* * * * *